US008649820B2

(12) United States Patent
Schwandt et al.

(10) Patent No.: US 8,649,820 B2
(45) Date of Patent: Feb. 11, 2014

(54) UNIVERSAL INTEGRATED CIRCUIT CARD APPARATUS AND RELATED METHODS

(75) Inventors: Sheldon Terry Schwandt, Wellesley (CA); Farzin Dehmoubed, Woodbridge (CA); James Carl Infanti, Waterloo (CA); James Randolph Winter Lepp, Ottawa (CA); Oleg Los, Buffalo Grove, IL (US)

(73) Assignee: Blackberry Limited, Waterloo, Ontario ( * ) Notice: Subject to any disclaimer, the term of this patent is extended or adjusted under 35 U.S.C. 154(b) by 0 days.

(21) Appl. No.: 13/290,874

(22) Filed: Nov. 7, 2011

(65) Prior Publication Data

US 2013/0116009 A1 May 9, 2013

(51) Int. Cl.
*H04M 1/00* (2006.01)
*H04B 1/38* (2006.01)

(52) U.S. Cl.
USPC .......................................... 455/557; 455/558

(58) Field of Classification Search
USPC ............... 455/575.1, 557–558; 235/380, 441, 235/487, 492
See application file for complete search history.

(56) References Cited

U.S. PATENT DOCUMENTS

| 3,373,481 A | 3/1968 | Lins et al. |
| 3,676,742 A | 7/1972 | Russell et al. |
| 3,825,353 A | 7/1974 | Loro |
| 3,842,189 A | 10/1974 | Southgate |
| D261,760 S | 11/1981 | Dlugos |
| 4,450,024 A | 5/1984 | Haghiri-Tehrani et al. |
| 4,535,219 A | 8/1985 | Sliwa, Jr. |
| 4,549,247 A | 10/1985 | Hoppe et al. |
| 4,591,945 A | 5/1986 | Ugon |
| 4,603,249 A | 7/1986 | Hoppe et al. |
| 4,617,605 A | 10/1986 | Obrecht et al. |
| 4,621,190 A | 11/1986 | Saito et al. |
| 4,625,102 A | 11/1986 | Rebjock et al. |
| 4,639,585 A | 1/1987 | Haghiri-Tehrani et al. |
| 4,674,175 A | 6/1987 | Stampfli |
| 4,755,661 A | 7/1988 | Ruebsam |
| 4,764,803 A | 8/1988 | Ueda |
| 4,774,633 A | 9/1988 | Dehaine et al. |
| 4,792,843 A | 12/1988 | Haghiri-Tehrani et al. |
| 4,803,542 A | 2/1989 | Haghiri-Tehrani et al. |
| 4,841,134 A | 6/1989 | Hida et al. |
| 4,860,087 A | 8/1989 | Matsubara et al. |
| 4,864,383 A | 9/1989 | Gloton et al. |
| 4,897,534 A | 1/1990 | Haghiri-Tehrani |
| 4,937,653 A | 6/1990 | Blonder et al. |
| 4,942,495 A | 7/1990 | Peres et al. |
| 4,980,802 A | 12/1990 | Champagne et al. |
| 4,994,659 A | 2/1991 | Yabe et al. |
| 5,027,190 A | 6/1991 | Haghiri-Tehrani et al. |
| 5,031,026 A | 7/1991 | Ueda |

(Continued)

OTHER PUBLICATIONS

United States Patent and Trademark Office, "Restriction Requirement," issued in connection with U.S. Appl. No. 29/418,880, mailed Dec. 20, 2012, 7 pages.

(Continued)

*Primary Examiner* — Simon Nguyen
(74) *Attorney, Agent, or Firm* — Haley, Flight & Zimmerman, LLC.

(57) ABSTRACT

UICCs are disclosed herein. An example UICC includes a body a body having a height between approximately 10.9 millimeters and 11.1 millimeters and a width between approximately 8.9 millimeters and 9.1 millimeters.

35 Claims, 10 Drawing Sheets

(56) References Cited

U.S. PATENT DOCUMENTS

| | | | |
|---|---|---|---|
| 5,055,907 A | 10/1991 | Jacobs | |
| 5,055,913 A | 10/1991 | Haghiri-Tehrani | |
| 5,057,460 A | 10/1991 | Rose | |
| 5,067,007 A | 11/1991 | Otsuka et al. | |
| 5,079,673 A | 1/1992 | Kodai et al. | |
| 5,086,216 A | 2/1992 | Mollet et al. | |
| 5,091,618 A | 2/1992 | Takahashi | |
| 5,091,769 A | 2/1992 | Eichelberger | |
| 5,122,860 A | 6/1992 | Kikuchi et al. | |
| 5,126,548 A | 6/1992 | Sekiguchi | |
| D327,883 S | 7/1992 | Gloton | |
| D328,599 S | 8/1992 | Gloton | |
| 5,149,662 A | 9/1992 | Eichelberger | |
| 5,150,193 A | 9/1992 | Yasuhara et al. | |
| D331,922 S | 12/1992 | Gloton | |
| 5,173,055 A | 12/1992 | Grabbe | |
| 5,192,682 A | 3/1993 | Kodai | |
| 5,192,716 A | 3/1993 | Jacobs | |
| D335,663 S | 5/1993 | Gloton | |
| 5,208,450 A | 5/1993 | Uenishi et al. | |
| 5,241,456 A | 8/1993 | Marcinkiewicz et al. | |
| 5,250,843 A | 10/1993 | Eichelberger | |
| 5,255,430 A | 10/1993 | Tallaksen | |
| D342,728 S | 12/1993 | Gloton | |
| 5,280,192 A | 1/1994 | Kryzaniwsky | |
| D344,502 S | 2/1994 | Gloton | |
| 5,296,745 A | 3/1994 | Shirai et al. | |
| 5,304,513 A | 4/1994 | Haghiri-Tehrani et al. | |
| 5,324,687 A | 6/1994 | Wojnarowski | |
| 5,327,834 A | 7/1994 | Atkeson | |
| 5,346,576 A | 9/1994 | Kobayashi et al. | |
| 5,360,941 A | 11/1994 | Roes | |
| D353,135 S | 12/1994 | Gloton | |
| D353,136 S | 12/1994 | Gloton | |
| 5,371,346 A | 12/1994 | Menoud | |
| 5,399,903 A | 3/1995 | Rostoker et al. | |
| D357,242 S | 4/1995 | Gloton | |
| D357,909 S | 5/1995 | Gloton | |
| D358,142 S | 5/1995 | Gloton | |
| 5,434,395 A | 7/1995 | Storck et al. | |
| RE35,119 E | 12/1995 | Blonder et al. | |
| D365,092 S | 12/1995 | Mundigl et al. | |
| 5,486,687 A | 1/1996 | Le Roux | |
| D369,157 S | 4/1996 | Ohmori et al. | |
| 5,506,499 A | 4/1996 | Puar | |
| 5,514,862 A | 5/1996 | Salzano | |
| 5,523,697 A | 6/1996 | Farnworth et al. | |
| 5,550,402 A | 8/1996 | Nicklaus | |
| 5,550,406 A | 8/1996 | McCormick | |
| 5,554,940 A | 9/1996 | Hubacher | |
| D375,303 S | 11/1996 | Gaumet | |
| 5,581,065 A | 12/1996 | Nishikawa et al. | |
| 5,583,733 A | 12/1996 | Cronin | |
| 5,598,032 A | 1/1997 | Fidalgo | |
| 5,599,203 A | 2/1997 | Broschard, III | |
| 5,612,532 A | 3/1997 | Iwasaki | |
| D379,006 S | 4/1997 | Gaumet | |
| 5,633,780 A | 5/1997 | Cronin | |
| 5,637,858 A | 6/1997 | Hoppe et al. | |
| 5,671,525 A | 9/1997 | Fidalgo | |
| D384,971 S | 10/1997 | Kawan | |
| 5,688,716 A | 11/1997 | DiStefano et al. | |
| D387,746 S | 12/1997 | Ishihara | |
| D387,747 S | 12/1997 | Ishihara | |
| D388,066 S | 12/1997 | Ishihara | |
| D389,130 S | 1/1998 | Ishihara | |
| 5,710,421 A | 1/1998 | Kokubu | |
| D393,458 S | 4/1998 | Merlin et al. | |
| 5,776,796 A | 7/1998 | DiStefano et al. | |
| 5,796,570 A | 8/1998 | Mekdhanasarn et al. | |
| 5,808,758 A | 9/1998 | Solmsdorf | |
| 5,815,426 A | 9/1998 | Jigour et al. | |
| 5,834,340 A | 11/1998 | Sawai et al. | |
| 5,834,755 A | 11/1998 | Haghiri-Tehrani et al. | |
| 5,864,463 A | 1/1999 | Tsukada et al. | |
| D405,779 S | 2/1999 | Huber et al. | |
| 5,888,624 A | 3/1999 | Haghiri et al. | |
| 5,891,745 A | 4/1999 | Dunaway et al. | |
| 5,898,223 A | 4/1999 | Frye et al. | |
| D412,164 S | 7/1999 | Laviron et al. | |
| 5,925,445 A | 7/1999 | Suzuki | |
| 5,932,866 A | 8/1999 | Terada et al. | |
| 5,965,866 A | 10/1999 | Mederski | |
| 5,969,951 A | 10/1999 | Fischer et al. | |
| D416,246 S | 11/1999 | Hileman | |
| 5,975,420 A | 11/1999 | Gogami et al. | |
| 5,995,006 A | 11/1999 | Walsh | |
| 6,006,987 A | 12/1999 | Hoolhorst | |
| 6,025,997 A | 2/2000 | Huber et al. | |
| 6,027,028 A | 2/2000 | Pieterse et al. | |
| 6,036,099 A | 3/2000 | Leighton | |
| 6,046,071 A | 4/2000 | Sawai et al. | |
| 6,054,774 A | 4/2000 | Ohmori et al. | |
| D424,043 S | 5/2000 | Shiroki | |
| D424,539 S | 5/2000 | Shiroki | |
| D425,519 S | 5/2000 | Merlin et al. | |
| 6,065,681 A | 5/2000 | Trueggelmann | |
| 6,072,698 A | 6/2000 | Houdeau et al. | |
| 6,076,737 A | 6/2000 | Gogami et al. | |
| 6,081,182 A | 6/2000 | Tomozawa et al. | |
| 6,095,423 A | 8/2000 | Houdeau et al. | |
| 6,109,530 A | 8/2000 | Larson et al. | |
| 6,141,210 A | 10/2000 | Iwasaki | |
| 6,142,381 A | 11/2000 | Finn et al. | |
| 6,145,035 A | 11/2000 | Mai et al. | |
| 6,147,860 A | 11/2000 | Iwasaki | |
| 6,161,761 A | 12/2000 | Ghaem et al. | |
| 6,175,287 B1 | 1/2001 | Lampen et al. | |
| 6,184,477 B1 | 2/2001 | Tanahashi | |
| 6,191,951 B1 | 2/2001 | Houdeau et al. | |
| 6,197,688 B1 | 3/2001 | Simpson | |
| 6,202,931 B1 | 3/2001 | Billebaud | |
| 6,223,989 B1 | 5/2001 | Permingeat | |
| D443,298 S | 6/2001 | Webb et al. | |
| 6,265,765 B1 | 7/2001 | DiStefano et al. | |
| 6,276,609 B1 | 8/2001 | Czar et al. | |
| 6,288,904 B1 | 9/2001 | Houdeau et al. | |
| 6,293,470 B1 | 9/2001 | Asplund | |
| 6,313,524 B1 | 11/2001 | Pueschner et al. | |
| 6,320,751 B2 | 11/2001 | Takeda et al. | |
| D452,243 S | 12/2001 | Wallace | |
| 6,326,683 B1 | 12/2001 | Houdeau et al. | |
| D452,864 S | 1/2002 | Wallace et al. | |
| D452,865 S | 1/2002 | Wallace et al. | |
| 6,343,364 B1 | 1/2002 | Leydier et al. | |
| D453,934 S | 2/2002 | Wallace et al. | |
| 6,351,405 B1 | 2/2002 | Lee et al. | |
| D456,414 S | 4/2002 | Turin | |
| 6,369,407 B1 | 4/2002 | Hikita et al. | |
| 6,370,029 B1 | 4/2002 | Kawan | |
| 6,378,774 B1 | 4/2002 | Emori et al. | |
| 6,398,114 B1 | 6/2002 | Nishikawa et al. | |
| 6,402,032 B1 | 6/2002 | Huang et al. | |
| 6,410,355 B1 | 6/2002 | Wallace | |
| 6,429,112 B1 | 8/2002 | Smith et al. | |
| 6,433,285 B2 | 8/2002 | Maeda et al. | |
| 6,439,464 B1 * | 8/2002 | Fruhauf et al. | 235/492 |
| 6,448,638 B1 | 9/2002 | Fidalgo et al. | |
| 6,454,164 B1 | 9/2002 | Wakabayashi et al. | |
| 6,460,773 B1 | 10/2002 | Kaiya et al. | |
| 6,462,273 B1 | 10/2002 | Corisis et al. | |
| 6,483,038 B2 | 11/2002 | Lee et al. | |
| 6,490,667 B1 | 12/2002 | Ikeda | |
| 6,514,367 B1 | 2/2003 | Leighton | |
| 6,542,444 B1 | 4/2003 | Rutsche | |
| 6,543,690 B2 * | 4/2003 | Leydier et al. | 235/451 |
| 6,568,600 B1 | 5/2003 | Carpier et al. | |
| 6,572,015 B1 | 6/2003 | Norton | |
| 6,581,122 B1 | 6/2003 | Sarat | |
| 6,581,840 B2 | 6/2003 | Takeda et al. | |
| 6,585,165 B1 | 7/2003 | Kuroda et al. | |
| 6,592,042 B1 | 7/2003 | El Yamani et al. | |
| 6,601,770 B1 | 8/2003 | Ikefuji et al. | |
| 6,612,498 B1 * | 9/2003 | Lipponen et al. | 235/486 |

(56) References Cited

U.S. PATENT DOCUMENTS

| | | |
|---|---|---|
| 6,618,258 B2 | 9/2003 | Goris |
| 6,628,240 B2 | 9/2003 | Amadeo |
| 6,632,997 B2 | 10/2003 | Hoffman et al. |
| 6,634,561 B1 | 10/2003 | Wallace |
| 6,634,565 B2 | 10/2003 | Gray |
| 6,641,049 B2 | 11/2003 | Luu |
| 6,642,611 B2 | 11/2003 | Iwasaki |
| 6,646,885 B1* | 11/2003 | Yu et al. .................. 361/737 |
| 6,659,355 B1 | 12/2003 | Fischer et al. |
| 6,659,356 B2 | 12/2003 | Kashima |
| 6,669,487 B1* | 12/2003 | Nishizawa et al. .......... 439/60 |
| 6,694,399 B1 | 2/2004 | Leydier et al. |
| D487,747 S | 3/2004 | Yu et al. |
| 6,712,279 B2 | 3/2004 | Muehlberger et al. |
| D488,818 S | 4/2004 | Lee et al. |
| 6,717,801 B1 | 4/2004 | Castell et al. |
| D492,688 S | 7/2004 | Wallace et al. |
| D493,798 S | 8/2004 | Yu et al. |
| 6,776,347 B2 | 8/2004 | Nishikawa et al. |
| 6,778,407 B2 | 8/2004 | Fischer et al. |
| 6,793,144 B2* | 9/2004 | Guez et al. ................ 235/492 |
| 6,803,114 B1 | 10/2004 | Vere et al. |
| 6,803,666 B2 | 10/2004 | Takahashi et al. |
| 6,817,533 B2 | 11/2004 | Chen |
| 6,817,534 B2 | 11/2004 | Gray |
| 6,851,606 B2* | 2/2005 | Maenpaa et al. ........... 235/380 |
| 6,851,618 B2 | 2/2005 | Halope |
| 6,856,235 B2 | 2/2005 | Fjelstad |
| 6,865,086 B2 | 3/2005 | Gochnour et al. |
| 6,870,733 B2 | 3/2005 | Castell et al. |
| 6,896,189 B2 | 5/2005 | Guion et al. |
| 6,910,635 B1 | 6/2005 | Miks et al. |
| 6,922,780 B1 | 7/2005 | Siegel |
| 6,970,359 B2 | 11/2005 | Gochnour et al. |
| 6,978,940 B2 | 12/2005 | Luu |
| D516,076 S | 2/2006 | Ko |
| 6,994,263 B2 | 2/2006 | Ueda et al. |
| D517,559 S | 3/2006 | Yu et al. |
| 7,019,981 B2 | 3/2006 | Heinemann et al. |
| 7,028,910 B2 | 4/2006 | Reignoux et al. |
| 7,030,316 B2 | 4/2006 | Centofante |
| 7,051,429 B2 | 5/2006 | Kerr et al. |
| D523,435 S | 6/2006 | Takiar et al. |
| 7,059,534 B2 | 6/2006 | Takahashi |
| 7,063,538 B2 | 6/2006 | Chen |
| 7,064,423 B2 | 6/2006 | Okita et al. |
| D525,248 S | 7/2006 | Takiar |
| D525,623 S | 7/2006 | Takiar et al. |
| D525,978 S | 8/2006 | Takiar et al. |
| 7,083,107 B2 | 8/2006 | Sakamoto et al. |
| 7,088,006 B2 | 8/2006 | Janke et al. |
| 7,094,106 B2 | 8/2006 | Yamamoto et al. |
| 7,094,633 B2 | 8/2006 | Takiar |
| D529,031 S | 9/2006 | Huang et al. |
| 7,102,891 B1 | 9/2006 | Miks et al. |
| 7,121,473 B2 | 10/2006 | Boker |
| 7,135,782 B2 | 11/2006 | Nishikawa |
| 7,137,563 B2 | 11/2006 | Shibamoto et al. |
| D533,556 S | 12/2006 | Yamada et al. |
| 7,152,801 B2* | 12/2006 | Cuellar et al. .............. 235/492 |
| D534,537 S | 1/2007 | Smith et al. |
| 7,166,914 B2 | 1/2007 | DiStefano et al. |
| D537,081 S | 2/2007 | Takiar et al. |
| 7,176,060 B2 | 2/2007 | Yamada et al. |
| 7,179,129 B1 | 2/2007 | Hwang |
| 7,180,176 B2 | 2/2007 | Endou et al. |
| D538,286 S | 3/2007 | Takiar et al. |
| 7,193,161 B1 | 3/2007 | Takiar et al. |
| 7,226,318 B1 | 6/2007 | Lee |
| 7,233,499 B2 | 6/2007 | Yu et al. |
| 7,234,644 B2 | 6/2007 | Nishizawa et al. |
| 7,239,973 B2* | 7/2007 | Schahl et al. .............. 702/122 |
| 7,242,079 B2 | 7/2007 | Nerot et al. |
| 7,252,242 B2 | 8/2007 | Ho |
| D552,098 S | 10/2007 | Nishizawa et al. |
| 7,291,903 B2 | 11/2007 | Nishizawa et al. |
| 7,296,754 B2 | 11/2007 | Nishizawa et al. |
| D556,764 S | 12/2007 | Nishizawa et al. |
| 7,303,137 B2 | 12/2007 | Ho |
| 7,336,498 B2 | 2/2008 | Takiar et al. |
| D566,723 S | 4/2008 | Okaro et al. |
| 7,352,588 B2 | 4/2008 | Nishizawa et al. |
| 7,359,204 B1 | 4/2008 | Jang et al. |
| 7,364,092 B2 | 4/2008 | Narendra et al. |
| 7,367,503 B2* | 5/2008 | Harai et al. ................ 235/441 |
| 7,369,982 B2* | 5/2008 | Leaming .................... 703/25 |
| 7,374,721 B2 | 5/2008 | Huang et al. |
| D570,800 S | 6/2008 | Chen et al. |
| D571,810 S | 6/2008 | Ikeda |
| 7,388,455 B2 | 6/2008 | Larson, III et al. |
| D573,154 S | 7/2008 | Viegers et al. |
| D574,384 S | 8/2008 | Knoch |
| D574,835 S | 8/2008 | Ho |
| 7,418,272 B2 | 8/2008 | Son |
| 7,425,464 B2 | 9/2008 | Fay et al. |
| 7,433,196 B1 | 10/2008 | Wang et al. |
| D581,932 S | 12/2008 | Nishizawa et al. |
| 7,458,519 B2 | 12/2008 | Aoki et al. |
| 7,475,818 B2 | 1/2009 | Gallagher et al. |
| 7,485,562 B2 | 2/2009 | Chua et al. |
| 7,486,520 B2 | 2/2009 | Tang et al. |
| 7,494,058 B2 | 2/2009 | Bonalle et al. |
| D588,080 S | 3/2009 | Harnden et al. |
| D589,471 S | 3/2009 | Komatsu |
| 7,511,365 B2 | 3/2009 | Wu et al. |
| 7,552,876 B2 | 6/2009 | Nishizawa et al. |
| 7,557,436 B2 | 7/2009 | Mizuno et al. |
| 7,559,469 B2 | 7/2009 | Noda et al. |
| 7,560,806 B2 | 7/2009 | Aoki |
| 7,566,001 B2 | 7/2009 | Yamazaki |
| D598,126 S | 8/2009 | Alvarez-Icaza et al. |
| D599,308 S | 9/2009 | Blumberg, Jr. et al. |
| D601,168 S | 9/2009 | Barcheck |
| 7,587,756 B2 | 9/2009 | Peart et al. |
| D601,521 S | 10/2009 | Komatsu |
| 7,597,266 B2 | 10/2009 | Benato |
| 7,605,453 B2 | 10/2009 | Stampka et al. |
| 7,606,042 B2 | 10/2009 | Goodwin |
| 7,607,583 B2 | 10/2009 | Berardi et al. |
| 7,615,855 B2 | 11/2009 | Osako et al. |
| 7,616,452 B2 | 11/2009 | Wehrly, Jr. et al. |
| 7,619,901 B2 | 11/2009 | Eichelberger et al. |
| 7,630,209 B2 | 12/2009 | Kim et al. |
| D608,770 S | 1/2010 | Deguchi et al. |
| 7,655,501 B2 | 2/2010 | Yang et al. |
| 7,662,667 B2 | 2/2010 | Shen |
| 7,663,564 B2 | 2/2010 | Ayala et al. |
| 7,667,318 B2 | 2/2010 | Yang et al. |
| D611,039 S | 3/2010 | Deguchi et al. |
| 7,669,773 B2 | 3/2010 | Nishizawa et al. |
| 7,675,151 B1 | 3/2010 | Boone |
| 7,686,228 B2 | 3/2010 | Oddou et al. |
| 7,719,846 B2 | 5/2010 | Fralicciardi et al. |
| 7,760,513 B2 | 7/2010 | Partridge et al. |
| 7,763,976 B2 | 7/2010 | Tang et al. |
| 7,768,796 B2 | 8/2010 | Cady et al. |
| 7,807,502 B2 | 10/2010 | Kwang et al. |
| 7,810,718 B2 | 10/2010 | Bonneau, Jr. et al. |
| 7,812,434 B2 | 10/2010 | Yang |
| D628,202 S | 11/2010 | Pomerantz et al. |
| 7,837,122 B2 | 11/2010 | Martinent et al. |
| 7,847,380 B2 | 12/2010 | Huang |
| 7,855,895 B2 | 12/2010 | Kim et al. |
| 7,862,381 B2 | 1/2011 | Miller |
| 7,874,491 B2 | 1/2011 | Janke et al. |
| 7,909,251 B2 | 3/2011 | Yi et al. |
| 7,909,611 B2 | 3/2011 | Miller |
| 7,914,296 B1 | 3/2011 | Howell |
| 7,922,097 B2 | 4/2011 | Yoshikawa et al. |
| D638,431 S | 5/2011 | Pomerantz et al. |
| 7,946,876 B1 | 5/2011 | Huang |
| 7,958,622 B1 | 6/2011 | Ayala et al. |
| 7,961,101 B2 | 6/2011 | Narendra et al. |
| 7,975,915 B2 | 7/2011 | Fidalgo et al. |

(56) References Cited

U.S. PATENT DOCUMENTS

| | | |
|---|---|---|
| 7,980,477 B2 | 7/2011 | Finn |
| D643,040 S | 8/2011 | Sedio et al. |
| 8,002,196 B2 | 8/2011 | Yu et al. |
| 8,003,513 B2 | 8/2011 | Shah et al. |
| 8,016,191 B2 | 9/2011 | Bonalle et al. |
| 8,030,745 B2 | 10/2011 | Yamazaki |
| 8,030,746 B2 | 10/2011 | Tan |
| 8,061,623 B2 | 11/2011 | Balchaytis |
| 8,061,625 B2 | 11/2011 | Yu et al. |
| 8,072,331 B2 | 12/2011 | Narendra et al. |
| 8,079,528 B2 | 12/2011 | Song |
| 8,085,547 B2 | 12/2011 | Wu et al. |
| D651,992 S | 1/2012 | Nishiguchi et al. |
| 8,107,246 B2 | 1/2012 | Fidalgo et al. |
| 8,110,434 B2 | 2/2012 | Okada et al. |
| 8,110,916 B2 | 2/2012 | Weng et al. |
| 8,127,997 B2 | 3/2012 | Droz |
| 8,136,725 B2 | 3/2012 | Yamazaki |
| 8,136,732 B2 | 3/2012 | Narendra et al. |
| 8,143,713 B2 | 3/2012 | Song et al. |
| 8,167,659 B2 | 5/2012 | Miller |
| 8,174,105 B2 | 5/2012 | Kwang et al. |
| 8,181,880 B2 | 5/2012 | Kwon et al. |
| 8,191,788 B2 | 6/2012 | Morrill-Webb et al. |
| 8,231,061 B2 | 7/2012 | Narendra et al. |
| D667,442 S | 9/2012 | Phelan |
| 8,268,702 B2 | 9/2012 | Takayama et al. |
| D669,478 S | 10/2012 | Lepp et al. |
| D669,479 S | 10/2012 | Lepp et al. |
| 8,297,518 B2 | 10/2012 | Yamazaki et al. |
| 8,301,915 B2 | 10/2012 | Watanabe et al. |
| 8,333,004 B2 | 12/2012 | Bashan et al. |
| 8,336,784 B2 | 12/2012 | Phillips |
| 8,342,416 B2 | 1/2013 | Kato |
| 8,422,238 B2 | 4/2013 | Hsiao et al. |
| D681,640 S | 5/2013 | Aoki et al. |
| D686,214 S | 7/2013 | Maus et al. |
| 8,507,377 B2 | 8/2013 | Watanabe et al. |
| 8,573,494 B2 | 11/2013 | Narendra et al. |
| 2001/0005291 A1 | 6/2001 | Iwasaki |
| 2001/0011685 A1 | 8/2001 | Fries et al. |
| 2001/0012682 A1 | 8/2001 | Kayanakis et al. |
| 2001/0038547 A1* | 11/2001 | Jigour et al. ............... 365/43 |
| 2002/0049887 A1* | 4/2002 | Takahashi ................. 711/115 |
| 2002/0069392 A1 | 6/2002 | Saitoh |
| 2002/0110955 A1 | 8/2002 | Patrice et al. |
| 2002/0186542 A1 | 12/2002 | Choi |
| 2003/0016116 A1 | 1/2003 | Blaha |
| 2003/0016507 A1 | 1/2003 | Fischer et al. |
| 2003/0024995 A1 | 2/2003 | Conner et al. |
| 2003/0024996 A1 | 2/2003 | Muehlberger et al. |
| 2003/0085287 A1 | 5/2003 | Gray |
| 2003/0102544 A1 | 6/2003 | Nishikawa |
| 2003/0103301 A1 | 6/2003 | Fechner |
| 2003/0116634 A1 | 6/2003 | Tanaka |
| 2003/0168515 A1 | 9/2003 | Gray |
| 2003/0226901 A1 | 12/2003 | Kim et al. |
| 2004/0031857 A1 | 2/2004 | Sato |
| 2004/0061234 A1 | 4/2004 | Shah et al. |
| 2004/0089717 A1 | 5/2004 | Harari et al. |
| 2004/0113265 A1 | 6/2004 | DiBattista et al. |
| 2004/0117317 A1 | 6/2004 | Feinman |
| 2004/0194861 A1 | 10/2004 | Endou et al. |
| 2004/0238857 A1 | 12/2004 | Beroz et al. |
| 2004/0245347 A1 | 12/2004 | Shibamoto et al. |
| 2004/0259423 A1 | 12/2004 | Elbaz et al. |
| 2005/0007744 A1 | 1/2005 | Okita et al. |
| 2005/0037540 A1 | 2/2005 | Pepe et al. |
| 2005/0082636 A1 | 4/2005 | Yashima et al. |
| 2005/0099269 A1 | 5/2005 | Diorio et al. |
| 2005/0156310 A1 | 7/2005 | Benner et al. |
| 2005/0197169 A1 | 9/2005 | Son |
| 2005/0202667 A1 | 9/2005 | Cohen et al. |
| 2005/0212690 A1 | 9/2005 | Nishikawa |
| 2005/0231921 A1 | 10/2005 | Noda et al. |
| 2005/0247785 A1* | 11/2005 | Bertin ........................ 235/441 |
| 2005/0252978 A1 | 11/2005 | Nishizawa et al. |
| 2006/0057892 A1* | 3/2006 | Bricaud et al. .............. 439/630 |
| 2006/0131429 A1 | 6/2006 | Knoll |
| 2006/0139901 A1 | 6/2006 | Meireles et al. |
| 2006/0142063 A1* | 6/2006 | Monsacre ................... 455/558 |
| 2006/0175417 A1 | 8/2006 | Ho |
| 2006/0175418 A1 | 8/2006 | Ho |
| 2006/0202034 A1* | 9/2006 | Wallace et al. .............. 235/441 |
| 2006/0205280 A1 | 9/2006 | Nishizawa et al. |
| 2007/0013396 A1 | 1/2007 | Kim et al. |
| 2007/0023532 A1 | 2/2007 | Narendra et al. |
| 2007/0025092 A1 | 2/2007 | Lee et al. |
| 2007/0095910 A1 | 5/2007 | Gallagher et al. |
| 2007/0108298 A1 | 5/2007 | Kalck et al. |
| 2007/0108521 A1 | 5/2007 | Dekker |
| 2007/0125866 A1* | 6/2007 | Nishizawa et al. ........... 235/492 |
| 2007/0138301 A1 | 6/2007 | Cinkler |
| 2007/0145133 A1 | 6/2007 | Jolivet |
| 2007/0152072 A1 | 7/2007 | Frallicciardi et al. |
| 2007/0153487 A1 | 7/2007 | Frallicciardi et al. |
| 2007/0213096 A1 | 9/2007 | Bella et al. |
| 2008/0006703 A1 | 1/2008 | Ortigosa Vallejo et al. |
| 2008/0010562 A1* | 1/2008 | Kim et al. ..................... 714/55 |
| 2008/0020800 A1 | 1/2008 | Xu |
| 2008/0054079 A1 | 3/2008 | Mullen |
| 2008/0054493 A1 | 3/2008 | Leddige et al. |
| 2008/0061150 A1 | 3/2008 | Philips |
| 2008/0076474 A1 | 3/2008 | Ho |
| 2008/0083831 A1 | 4/2008 | Perez Lafuente et al. |
| 2008/0088038 A1 | 4/2008 | Hsu et al. |
| 2008/0099559 A1* | 5/2008 | Lo et al. ..................... 235/441 |
| 2008/0099932 A1 | 5/2008 | Silverbrook |
| 2008/0101986 A1 | 5/2008 | Saini et al. |
| 2008/0102895 A1 | 5/2008 | Fernandez |
| 2008/0112852 A1 | 5/2008 | Neel et al. |
| 2008/0135625 A1 | 6/2008 | Waschk |
| 2008/0135626 A1 | 6/2008 | Reignoux et al. |
| 2008/0144650 A1 | 6/2008 | Boch et al. |
| 2008/0146280 A1 | 6/2008 | Sasse et al. |
| 2008/0149737 A1 | 6/2008 | Ohshima |
| 2008/0153205 A1* | 6/2008 | Nishizawa et al. ........... 438/109 |
| 2008/0164324 A1 | 7/2008 | Song |
| 2008/0182120 A1 | 7/2008 | Tan et al. |
| 2008/0223937 A1 | 9/2008 | Preta et al. |
| 2008/0245877 A1 | 10/2008 | Billebaud et al. |
| 2008/0257967 A1 | 10/2008 | Nishizawa et al. |
| 2008/0263363 A1 | 10/2008 | Jueneman et al. |
| 2008/0265038 A1 | 10/2008 | Mumbru Forn et al. |
| 2008/0265039 A1 | 10/2008 | Skowronek et al. |
| 2008/0272197 A1 | 11/2008 | Nishizawa et al. |
| 2008/0277484 A1 | 11/2008 | Launay et al. |
| 2008/0290160 A1 | 11/2008 | Huot et al. |
| 2008/0299860 A1 | 12/2008 | Lee et al. |
| 2008/0302876 A1 | 12/2008 | Mullen |
| 2008/0308640 A1 | 12/2008 | Chien |
| 2008/0308641 A1 | 12/2008 | Finn |
| 2009/0032593 A1 | 2/2009 | Ljungerantz |
| 2009/0040116 A1 | 2/2009 | Eray |
| 2009/0057417 A1 | 3/2009 | Shinohara et al. |
| 2009/0061933 A1* | 3/2009 | Lo et al. ..................... 455/558 |
| 2009/0065587 A1 | 3/2009 | Philips |
| 2009/0065591 A1 | 3/2009 | Paul et al. |
| 2009/0065592 A1 | 3/2009 | Paul et al. |
| 2009/0069052 A1 | 3/2009 | Jain et al. |
| 2009/0079053 A1 | 3/2009 | Huang |
| 2009/0084858 A1 | 4/2009 | Borracci |
| 2009/0101722 A1 | 4/2009 | Ortigosa Vallejo et al. |
| 2009/0108063 A1 | 4/2009 | Jain et al. |
| 2009/0111522 A1 | 4/2009 | Robles |
| 2009/0121020 A1 | 5/2009 | Gallagher et al. |
| 2009/0127345 A1 | 5/2009 | Chamley et al. |
| 2009/0140443 A1 | 6/2009 | Hohlfeld et al. |
| 2009/0156254 A1 | 6/2009 | Montes |
| 2009/0160071 A1 | 6/2009 | Shen |
| 2009/0166895 A1 | 7/2009 | Noguchi et al. |
| 2009/0169013 A1 | 7/2009 | Fascenda et al. |
| 2009/0172279 A1* | 7/2009 | Yuan et al. ................... 711/115 |
| 2009/0173793 A1 | 7/2009 | Kojo et al. |

(56) References Cited

U.S. PATENT DOCUMENTS

| | | | |
|---|---|---|---|
| 2009/0200382 A1 | 8/2009 | Kwon et al. | |
| 2009/0210569 A1 | 8/2009 | Lusetti et al. | |
| 2009/0216681 A1 | 8/2009 | McCown | |
| 2009/0224888 A1 | 9/2009 | Caruana | |
| 2009/0235037 A1 | 9/2009 | Mounier et al. | |
| 2009/0242646 A1 | 10/2009 | Aznar et al. | |
| 2009/0245029 A1 | 10/2009 | Kam | |
| 2009/0250523 A1 | 10/2009 | Tran | |
| 2009/0272815 A1 | 11/2009 | Tanner et al. | |
| 2009/0302119 A1 | 12/2009 | Dohmann et al. | |
| 2010/0001080 A1 | 1/2010 | Sim et al. | |
| 2010/0025480 A1* | 2/2010 | Nishizawa et al. | 235/492 |
| 2010/0032487 A1 | 2/2010 | Bohn et al. | |
| 2010/0033307 A1 | 2/2010 | Narendra et al. | |
| 2010/0033310 A1 | 2/2010 | Narendra et al. | |
| 2010/0038435 A1 | 2/2010 | Tomoeda | |
| 2010/0049878 A1 | 2/2010 | Yu et al. | |
| 2010/0072284 A1* | 3/2010 | Nishizawa et al. | 235/492 |
| 2010/0072618 A1 | 3/2010 | Camacho et al. | |
| 2010/0078485 A1 | 4/2010 | Li | |
| 2010/0078486 A1 | 4/2010 | Kai et al. | |
| 2010/0084759 A1 | 4/2010 | Shen | |
| 2010/0140814 A1 | 6/2010 | Jones et al. | |
| 2010/0176207 A1 | 7/2010 | Yoshikawa et al. | |
| 2010/0190528 A1 | 7/2010 | Hsiao et al. | |
| 2010/0200661 A1 | 8/2010 | Shafran et al. | |
| 2010/0203870 A1 | 8/2010 | Hubinak et al. | |
| 2010/0223403 A1 | 9/2010 | Chau et al. | |
| 2010/0227644 A1 | 9/2010 | Yu et al. | |
| 2010/0262840 A1 | 10/2010 | Benteo et al. | |
| 2010/0273528 A1 | 10/2010 | Yu et al. | |
| 2010/0285841 A1 | 11/2010 | Jolivet et al. | |
| 2010/0293784 A1 | 11/2010 | Bashan et al. | |
| 2010/0312698 A1 | 12/2010 | Bonalle et al. | |
| 2011/0059773 A1 | 3/2011 | Neumann et al. | |
| 2011/0077051 A1 | 3/2011 | Brown et al. | |
| 2011/0111593 A1 | 5/2011 | Kanno | |
| 2011/0115060 A1 | 5/2011 | Chiu et al. | |
| 2011/0117961 A1 | 5/2011 | Kim et al. | |
| 2011/0125967 A1 | 5/2011 | Kim et al. | |
| 2011/0147463 A1 | 6/2011 | Schiller et al. | |
| 2011/0147467 A1 | 6/2011 | Choi | |
| 2011/0149533 A1 | 6/2011 | Luo et al. | |
| 2011/0171996 A1 | 7/2011 | Narendra et al. | |
| 2011/0180599 A1 | 7/2011 | Hu et al. | |
| 2011/0186641 A1 | 8/2011 | Kato et al. | |
| 2011/0194265 A1 | 8/2011 | Su et al. | |
| 2011/0204147 A1 | 8/2011 | Amadeo et al. | |
| 2011/0210177 A1 | 9/2011 | Pepin et al. | |
| 2011/0223972 A1* | 9/2011 | Narendra et al. | 455/558 |
| 2011/0233545 A1 | 9/2011 | Shin et al. | |
| 2011/0253793 A1 | 10/2011 | King | |
| 2011/0253795 A1 | 10/2011 | Kato | |
| 2011/0259966 A1 | 10/2011 | Philips | |
| 2011/0298585 A1 | 12/2011 | Barry | |
| 2011/0304060 A1 | 12/2011 | Qin et al. | |
| 2012/0048948 A1 | 3/2012 | Bertin et al. | |
| 2012/0074231 A1* | 3/2012 | Jain et al. | 235/492 |
| 2012/0104634 A1 | 5/2012 | Weng et al. | |
| 2012/0161337 A1 | 6/2012 | Utsumi | |
| 2012/0225691 A1 | 9/2012 | Desjeux et al. | |
| 2012/0256324 A1 | 10/2012 | Liao et al. | |
| 2012/0289196 A1* | 11/2012 | Tan et al. | 455/411 |
| 2012/0292395 A1 | 11/2012 | Huang et al. | |
| 2013/0015441 A1 | 1/2013 | Takayama et al. | |
| 2013/0084918 A1 | 4/2013 | Sheshadri | |

OTHER PUBLICATIONS

United States Patent and Trademark Office, "Restriction Requirement," issued in connection with U.S. Appl. No. 29/418,619, mailed Jan. 17, 2013, 9 pages.
United States Patent and Trademark Office, "Restriction Requirement," issued in connection with U.S. Appl. No. 29/418,309, mailed Dec. 28, 2012, 9 pages.
Nokia, "Nokia 4FF Proposal and Rationale," based on the discussion and feedback from leading suppliers and manufacturers of SIM card connectors, Aug. 25, 2011, 5 pages.
ETSI, "ETSI TS 102 221," V9.2.0, Technical Specification, Oct. 2010, 179 pages.
ETSI, ETSI TS 102 412, V11.0.0, Technical Specification, May 2011, 90 pages.
ETSI, ETSI TS 102 600, V10.0.0, Techincal Specification, Oct. 2010, 26 pages.
ETSI, ETSI TS 102 613, V9.2.0, Mar. 2011, 57 pages.
ETSI, ETSI TS 102 671, V9.1.0, Sep. 2011, 21 pages.
TE Connectivity, "Recommendations 4FF SIM for ETSI," Mar. 30, 2011, 9 pages.
"3GPP TSG-CT6#55," Distributing mini-UICC as punch out from Plug-in or double punch-out from ID-1, Kyoto, Japan, May 11-14, 2010, 2 pages.
"ETSI TC SCP Meeting #51," San Diego, CA, Jul. 21-22, 2011, 5 pages.
"ETSI SCP TEC Meeting #40," Sophia Antipolis, France, Aug. 29-Sep. 1, 2011, 5 pages.
"ETSI TC SCP TEC #40," Sophia-Antipolis, France, Aug. 26-Sep. 1, 2011, 1 page.
"iPhone Teardown," © 2011 iFixit, 4 pages.
International Organization for Standardization, "Identification Cards—Physical Characteristics," ISO/IEC 7810, Nov. 1, 2003, 26 pages.
International Organization for Standardization, "Identification Cards—Integrated Circuit Cards," ISO/IEC 7816-1, Feb. 15, 2011, 8 pages.
International Organization for Standardization, "Identification Cards—Integrated Circuit Cards," ISO/IEC 7816-2, Oct. 15, 2007, 14 pages.
International Organization for Standardization, "Identification Cards—Integrated Circuit Cards," ISO/IEC 7816-3, Nov. 1, 2006, 58 pages.
SMK, "Push-Push Style Micro SIM Memory Card Connector," retrieved from www.smkusa.com/usa/featured_products/mem/, Dec. 12, 2011, 4 pages.
State Intellectual Property Office of P.R. China, "Office Action," with unverified redacted English translation, issued in connection with Chinese application serial No. 201230153596, issued Sep. 18, 2012, 2 pages.
United States Patent and Trademark Office, "Non-Final Office Action," issued in connection with U.S. Appl. No. 29/405,848, issued Oct. 2, 2012, 4 pages.
United States Patent and Trademark Office, "Non-Final Office Action," issued in connection with U.S. Appl. No. 29/405,845, issued Sep. 27, 2012, 4 pages.
Canadian Intellectual Property Office, "Office Action," issued in connection with Canadian application serial No. 145596, issued Oct. 26, 2012, 2 pages.
United States Patent and Trademark Office, "Ex Parte Quayle Action," issued in connection with U.S. Appl. No. 29/418,309, issued Feb. 6, 2013, 6 pages.
United States Patent and Trademark Office, "Ex Parte Quayle Action," issued in connection with U.S. Appl. No. 29/418,619, issued Feb. 27, 2013, 6 pages.
United States Patent and Trademark Office, "Ex Parte Quayle Action," issued in connection with U.S. Appl. No. 29/418,880, issued Feb. 7, 2013, 29 pages.
United States Patent and Trademark Office, "Final Office Action," issued in connection with U.S. Appl. No. 29/405,848, issued Feb. 22, 2013, 11 pages.
United States Patent and Trademark Office, "Restriction Requirement," issued in connection with U.S. Appl. No. 29/419,286, issued Mar. 7, 2013, 9 pages.
Ex Parte Quayle, issued by the United States Patent and Trademark Office in connection with U.S. Appl. No. 29/418,309, on Jun. 21, 2013, 48 pages.
Ex Parte Quayle, issued by the United States Patent and Trademark Office in connection with U.S. Appl. No. 29/418,619, on Jun. 20, 2013, 49 pages.

(56) References Cited

OTHER PUBLICATIONS

Ex Parte Quayle, issued by the United States Patent and Trademark Office in connection with U.S. Appl. No. 29/418,880, on Jun. 28, 2013, 22 pages.

Ex Parte Quayle, issued by the United States Patent and Trademark Office in connection with U.S. Appl. No. 29/419,286, on Jun. 20, 2013, 32 pages.

Notice of Allwowance and Fee(s), issued by the United States Patent and Trademark Office in connection with U.S. Appl. No. 29/405,848, on Jun. 25, 2013, 7 pages.

The United States Patent and Trademark Office, Notice of Allowance and Fee(s) Due, issued in connection with U.S. Appl. No. 29/419,286, mailed Nov. 12, 2013, 35 pages.

The United States Patent and Trademark Office, Notice of Allowance and Fee(s) Due, issued in connection with U.S. Appl. No. 29/418,880, mailed Nov. 12, 2013, 21 pages.

The United States Patent and Trademark Office, Notice of Allowance and Fee(s) Due, issued in connection with U.S. Appl. No. 29/418,619, mailed Nov. 14, 2013, 22 pages.

The United States Patent and Trademark Office, Notice of Allowance and Fee(s) Due, issued in connection with U.S. Appl. No. 29/418,309, mailed Nov. 14, 2013, 21 pages.

Canadian Intellectual Property Office, Industrial Design Certificate of Registration, issued in connection with Canadian Patent Application No. 147625 on Sep. 18, 2013, 8 pages.

Canadian Intellectual Property Office, Industrial Design Certificate of Registration, issued in connection with Canadian Patent Application No. 147626 on Sep. 18, 2013, 8 pages.

Canadian Intellectual Property Office, Industrial Design Examiner's Report, issued in connection with Canadian Patent Application No. 147627 on Sep. 19, 2013, 2 pages.

* cited by examiner

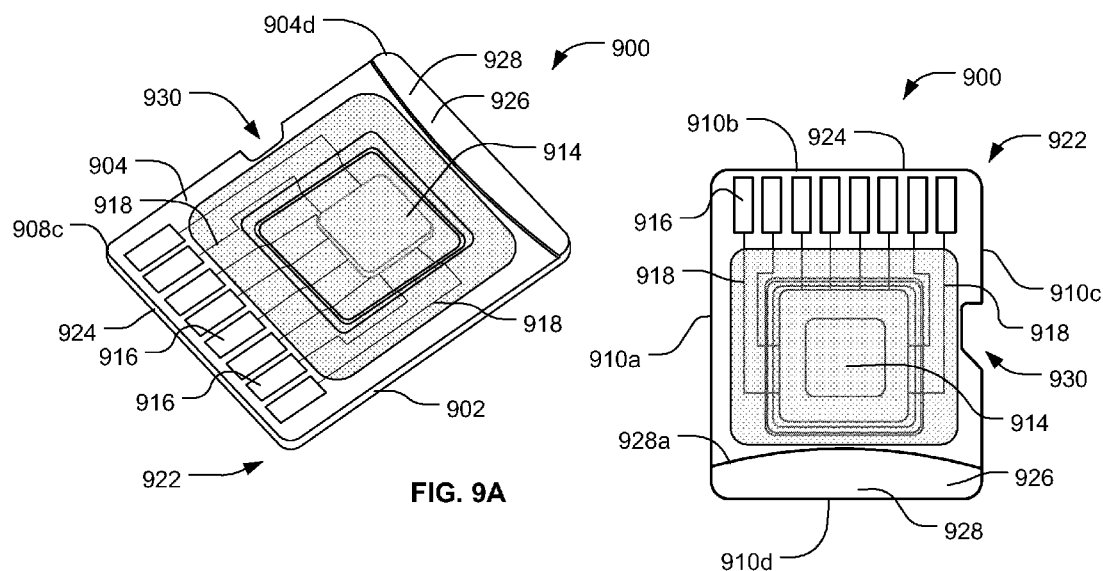
FIG. 9A
FIG. 9B
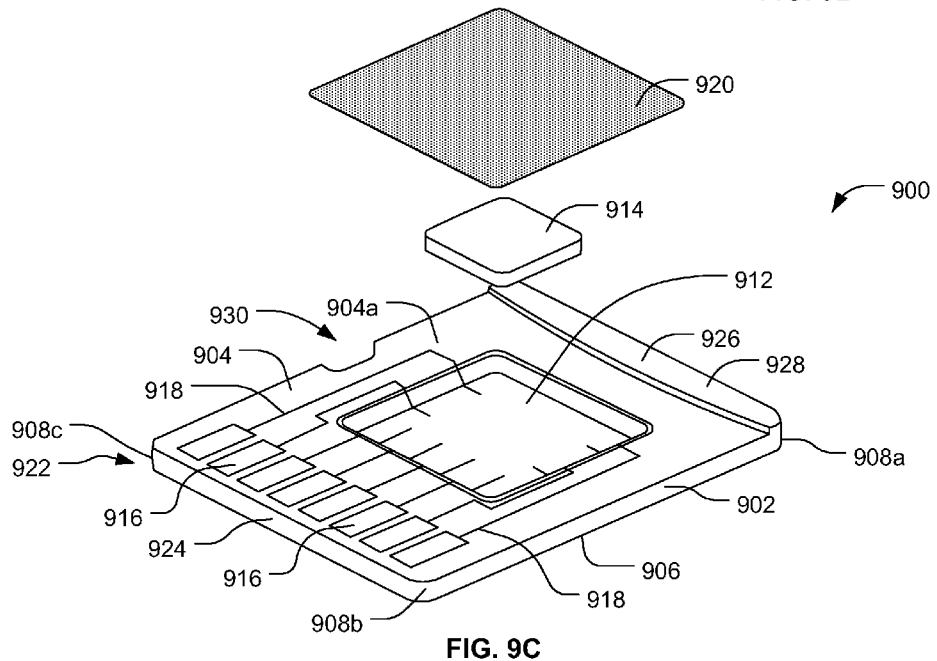
FIG. 9C

UNIVERSAL INTEGRATED CIRCUIT CARD APPARATUS AND RELATED METHODS

FIELD OF DISCLOSURE

The present disclosure relates to universal integrated circuit cards, including but not limited to, universal integrated circuit card apparatus and related methods.

BACKGROUND

Electronic devices, including portable electronic devices, have gained widespread use and may provide a variety of functions including, for example, telephonic, electronic messaging, and other personal information manager (PIM) application functions. Portable electronic devices include, for example, several types of mobile stations such as simple cellular telephones, smart telephones, tablet computers, wireless personal digital assistants (PDAs), and laptop computers with wireless 802.11 or Bluetooth capabilities.

Electronic devices such as, for example, portable electronic devices often connect to a network (e.g., a mobile network). These devices often employ a Universal Integrated Circuit Card (hereinafter UICC) to identify a subscriber for network access. For example, the UICC can store a Subscriber Identity Module (e.g., a SIM card, USIM card, RUIM, CSIM, etc.) that authenticates a subscriber to a network such as a mobile network. The UICC may also store other subscriber-related information for non-telecom applications. For example, the UICC can enable contactless data flow for identity, security, banking, payment applications and/or any other application associated with transmitting and securing personal data of a user.

BRIEF DESCRIPTION OF THE DRAWINGS

FIG. 9A is a perspective view of another example UICC disclosed herein.

FIG. 9B is a plan view of the example UICC of FIG. 9A.

FIG. 9C is an exploded view of the example UICC of FIG. 9A and FIG. 9B.

DETAILED DESCRIPTION

Figure 1A:
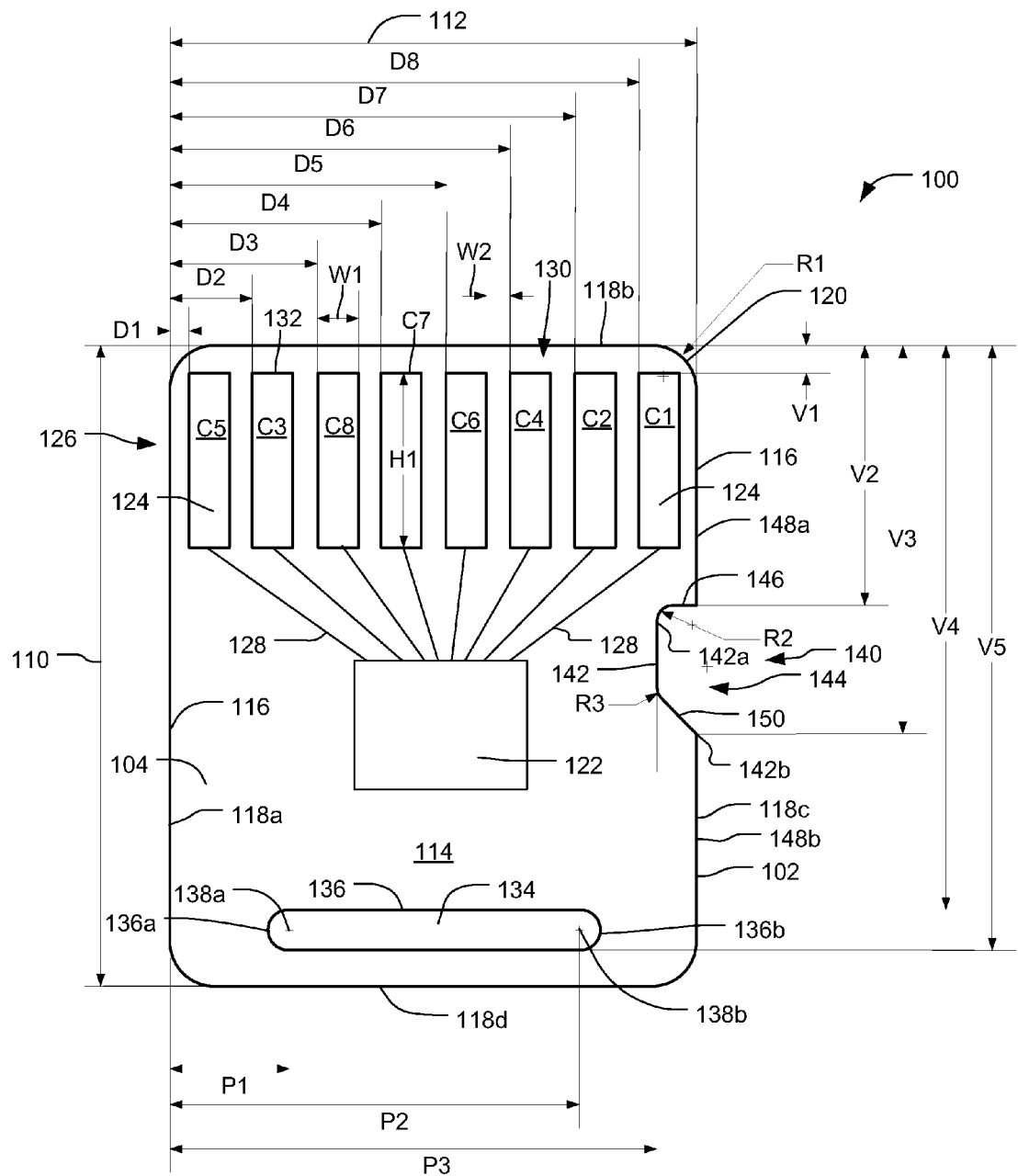
FIG. 1A illustrates an example UICC disclosed herein.

Universal integrated circuit cards (UICCs) are often used as a Subscriber Identity Module (e.g., SIM card, USIM card, RUIM card or CSIM card) in a portable electronic device such as a mobile device. A Subscriber Identity Module is a network access application that is stored in the UICC to authenticate a subscriber to a network. In some examples, a UICC enables contactless communication (Near Field Communication) with a host (e.g., a remote terminal) based on proximity of the UICC relative to the host.

Typically, a UICC includes a body to support an integrated circuit or microprocessor and a plurality of electrical contacts to enable communication between the microprocessor and a host (e.g., a computer, a mobile device, a non-mobile device, a remote terminal, etc.). The host typically employs an input device (e.g., a card reader) to accept the body and complete a circuit with the electrical contacts to enable communication (e.g., transfer data) between the UICC and the host.

Currently, physical characteristics or parameters of UICCs are governed by certain international standards provided by, for example, the European Telecommunications Standards Institute (ETSI) and the International Standard Organization (ISO). In particular, physical characteristics or parameters of an UICC are provided by certain form factor standards (e.g., ID-1, plug-in UICC, a mini-UICC) defined by International Standard Organization ISO/IEC 7816-2 and 7816-3 and/or Technical Specification of the European Telecommunications Standards Institute ETSI TS 102 221.

For example, ISO/IEC 7816-2 and/or ETSI TS 102 221 standards define an overall dimensional envelope of conforming UICCs. For example, mini-UICC form factor standards define an overall dimensional envelope of a UICC as 15 millimeters by 12 millimeters, which provides a surface area of 180 millimeters squared. Further, the current standards define a layout of electrical contacts on the UICC as a grid pattern (e.g., 4 by 2 grid pattern) that provides a surface area greater than 1 centimeter squared.

Further, an order or arrangement in which electrical contacts are to be positioned on the UICC is also defined by the standards. For example, the standards specify that a first row of electrical contacts should include a voltage supply, a reset, a clock and an optional first auxiliary, and a second row of electrical contacts should include a ground, a single-wire protocol, an input/output and an optional second auxiliary. However, by providing such an arrangement, the first row of electrical contacts typically pass across electrical contacts of an input device associated with the second row of electrical contacts when the UICC is inserted into the input device, which may cause the circuit card to become electrically damaged (e.g., short circuit). Further, the supply voltage (e.g., the first contact in the first row) is disposed adjacent the ground (e.g., the first contact in the second row), which may increase and/or cause a greater amount of electromagnetic interference (EMI).

While the current specifications ISO/IEC 7816-2 and 7816-3 and ETSI TS 102 221 define standards of a UICC, such standards also influence the design (e.g., the size, shape or footprint) of an input device or card reader, which can also significantly increase a dimensional envelope of a portable electronic device. In some example electronic devices, an input device or card reader covers the greatest amount of surface area of an electronic board of an electronic device (e.g., a mobile phone) compared to other electronic components of the electronic device. For example, by specifying the electrical contacts or pads disposed across an (x) by (y) surface area, an input device having a minimum surface area specified by the (x) by (y) surface area of the electrical contacts is required to properly couple to the electrical contacts of the circuit card. However, smaller electronic devices are generally desirable for portability. As a result, current standards may not be sufficient to reduce the size and/or an overall footprint of a mobile device.

Some known input devices often employ a push-push mechanism to insert/remove a UICC from an input device. A push-push mechanism requires a user to slide the card inside a slot of the input device. To remove the card, a user pushes the card further into the slot and a spring-loaded mechanism ejects the card from the slot. However, push-push card readers often require a door or other holding element to prevent the UICC from sliding out of the card reader (e.g., prevent unintended removal of the card). However, the door and/or holding element may damage easily and/or are relatively more expensive to manufacture.

Another example input device or card reader employs a push-pull configuration. In such example, a UICC is pulled from a slot of the card reader. However, UICCs typically have relatively flat and/or smooth surfaces that make it difficult for the user to grip and pull the card from the card reader. As a result, some example electronic devices employ a tray-style input device or card reader. However, tray-style card-readers typically increase the overall costs and dimensional envelope of an electronic device and/or require a unique tool (e.g., a pin) to remove the tray-style card reader from an electronic device.

In general, example UICCs disclosed herein modify or deviate from the standards provided by ISO/IEC 7816-2 and 7816-3 and/or ETSI TS 102 221 to define another UICC form factor standard. In particular, UICCs disclosed herein provide significantly smaller overall footprints compared to UICCs manufactured per the current specifications and/or standards provided by ISO/IEC 7816-2 and 7816-3 and/or ETSI TS 102 221. In addition, the UICCs disclosed herein also reduce the overall space requirements of an input device or card reader coupled to an electronic device.

In one example, the overall dimensional envelope of the UICC disclosed herein may have a height of between about 10.9 and 11.1 millimeters and a width of between approximately 8.9 and 9.1 millimeters. As a result, a UICC disclosed herein may have a surface area of approximately 99 millimeters squared, thereby significantly reducing the overall dimensional footprint or size of a UICC compared to known UICCs.

In another example, a layout scheme of electrical contacts or electrical pads may differ from a layout provided by, for example, the current ISO/IEC 7816-2 and 7816-3 and/or the ETSI TS 102 221 standards. For example, the electrical contacts disclosed herein may be disposed or coupled to the UICC in a single-row orientation or configuration. As a result, an electronic device may employ a header-style input device or card reader, which uses significantly less surface area of a circuit board (e.g., a logic board) of the electronic device compared to, for example, a multi-dimensional input device (e.g., a multi-row card reader).

Further, unlike known UICC having multi-dimensional electrical contacts, aligning the electrical contacts in a single-row configuration makes the UICC less prone to electrical damage (e.g., short circuit) that may otherwise occur when the circuit card is inserted into an input device as noted above.

Additionally or alternatively, in contrast to the current standards provided by ISO/IEC 7816-2 and 7816-3 and/or ETSI TS 102 221, a supply voltage contact and a ground contact of the UICC disclosed herein can be spaced apart from each other to significantly reduce electrical damage (e.g., short circuit) and/or EMI.

Additionally or alternatively, example UICCs disclosed herein may employ a locking mechanism to retain the circuit card in the input device without the use of doors. The locking feature also substantially prevents improper orientation of the circuit card relative to the input device and substantially prevents movement of the circuit card relative to the input device when an electronic device experiences sudden shock or vibration (e.g., if the electronic device is dropped). Also, to facilitate insertion of the circuit card relative to the input device, example UICCs disclosed herein may employ a lead-in feature (e.g., a chamfer). Further, to facilitate removal of the circuit card relative to the input device, example UICCs disclosed herein may employ a pick-out feature (e.g., a ridge, an opening, etc.).

Figure 1B:
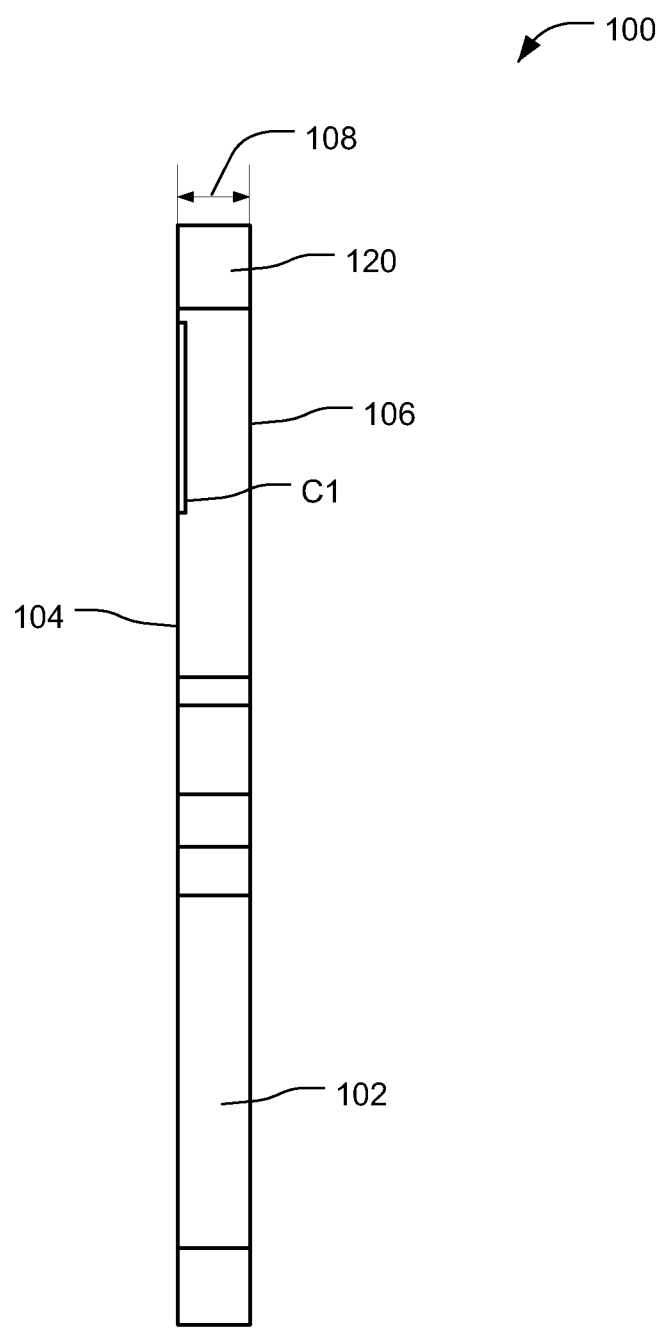
FIG. 1B is a side view of the example UICC of FIG. 1A.

FIG. 1A illustrates an example UICC 100 disclosed herein (hereinafter referred to as "UICC"). FIG. 1B is a side view of the example UICC 100 of FIG. 1A. Referring to FIGS. 1A and 1B, the UICC 100 comprises a body 102 defining a first or front side 104 and a second or rear side 106 opposite the first side 104. The first and second sides 104 and 106 of the illustrated example are spaced apart by a thickness 108 (FIG. 1B). In this example, the thickness 108 is between approximately 0.69 and 0.81 millimeters. Further, in the illustrated example, a height 110 of the body 102 may be between approximately 10.9 millimeters and 11.1 millimeters and a width 112 of the body 102 may be between approximately 8.9 millimeters and 9.1 millimeters. In particular, the height 110 of the body 102 is approximately 11 millimeters and the width 112 of the body 102 is approximately 9 millimeters.

As shown in FIG. 1A, the body 102 of the illustrated example includes a generally rectangular shape defining a first surface 114. More specifically, the first surface 114 has a surface area of approximately 99 millimeters squared. As shown in the illustrated example of FIG. 1A, the first surface 114 of the body 102 is defined by peripheral edges 116. In particular, the first surface 114 is defined by a first edge 118*a* (e.g., a left edge), a second edge 118*b* (e.g., an upper edge), a third edge 118*c* (e.g., a right edge), and a fourth edge 118*d* (e.g., a bottom edge). The second edge 118*b* is positioned opposite the fourth edge 118*d* relative to the body 102 and the first edge 118*a* is positioned opposite the third edge 118*c* relative to the body 102. The second and fourth edges 118*b* and 118*d* are disposed between the first and third edges 118*a* and 118*c*, and the second and fourth edges 118*b* and 118*d* are substantially perpendicular to the first and third edges 118*a* and 118*c*. As shown, the first and third edges 118*a* and 118*c* are substantially parallel relative to each other and the second and fourth edges 118*b* and 118*d* are substantially parallel relative to each other.

As shown in FIGS. 1A and 1B, to facilitate insertion of the UICC 100 in an input device or terminal (e.g., a card reader), each of the peripheral edges 116 may include a lead-in feature 120. As shown in FIGS. 1A and 1B, the lead-in feature 120 includes rounded corners each having a radius R1. For example, the radius R1 of the illustrated example may be less than or equal to 0.80 millimeters.

To communicate with a host, the UICC 100 includes an integrated circuit 122 (e.g., an IC). For example, the UICC 100 may include a microprocessor to communicate with a host via, for example, an input device or terminal. To communicatively couple the integrated circuit 122 of the UICC to an electronic device, the UICC of the illustrated example includes a plurality of electrical contacts or contact areas 124. The electrical contacts 124 are disposed on the first surface 114 adjacent the second edge 118b and between the first and third edges 118a and 118c. More specifically, in this example, the electrical contacts 124 are substantially aligned relative to each other in a single row orientation or configuration 126.

In this manner, an electronic device may employ an input device such as, for example, a header-style card reader having a significantly smaller dimensional envelope to significantly reduce an overall dimensional footprint of the electronic device. Additionally or alternatively, providing the electrical contacts 124 in the single row orientation 126 prevents the electrical contacts 124 from passing over other electrical connectors of an input device as the UICC 100 is inserted into the input device, which significantly prevents electrical damage to the UICC 100. However, in other examples, the plurality of electrical contacts 124 may be disposed on the first surface 114 in a staggered pattern, an offset pattern, and/or any other suitable pattern(s). For example, as described below, example UICC apparatus disclosed herein may include multiple rows of electrical contacts 124. In some examples, the electrical contacts 124 may be disposed about a perimeter of the UICC 100 relative to the peripheral edges 116 in, for example, a square pattern, a rectangular pattern, etc.

As shown in FIG. 1A, a classification of the electrical contacts 124 are in accordance with the classification of electrical contacts provided by standards ISO/IEC 7816-2 and 7816-3 and/or ETSI TS 102 221. For example, the electrical contacts 124 of the illustrated example include a supply voltage contact C1, a reset contact C2, a clock contact C3, a first auxiliary contact C4, a ground contact C5, a single-wire protocol contact C6 (e.g., (SWP) for Near-Field Communication (NFC) or proximity transactions), an input/output contact C7, and a second auxiliary contact C8. In some examples, the electrical contacts C4 and C8 can implement a high speed USB interface between the UICC and the host or terminal. The single-wire protocol contact C6 and/or the first and second auxiliary contacts C4 and C8 are optional and may be omitted. In other examples, the UICC 100 may employ any other type of electrical contacts other than those described or represented by electrical contacts C1-C8.

As shown in FIG. 1A, the plurality of contacts 124 are electrically coupled to the integrated circuit 122 via a plurality of wires, traces and/or a bus 128. The integrated circuit 122 may provide a central processor unit (CPU), volatile memory (RAM), non-volatile memory (ROM), etc. The supply voltage contact C1 supplies the integrated circuit 122 with electricity, the ground contact C5 grounds the integrated circuit 122, the reset contact C2 resets the integrated circuit 122, the clock contact C3 provides a clock signal or time reference, and the input/output contact C7 enables performance of data input and output. The optional single-wire protocol contact C6 enables contactless or wireless communication with a remote terminal or host in proximity with the UICC 100. The optional auxiliary contacts C4 and C8 enable the UICC 100 to be coupled to, for example, Universal Serial Bus (USB) interfaces.

In addition to the single row orientation 126 to reduce the overall footprint of an input device and/or significantly reduce the likelihood of electrical damage to the UICC 100, the electrical contacts 124 are arranged on the first surface 114 in a certain order to significantly reduce EMI. For example, the ground contact C5 is spaced apart from the supply voltage contact C1. In other words, at least one other electrical contact C2-C4 and/or C6-C8 (or other electrical contacts) is disposed between the ground contact C5 and the supply voltage contact C1. As shown in FIG. 1A, the ground contact C5 is disposed adjacent the first edge 118a and the supply voltage contact C1 is disposed adjacent the third edge 118c. More specifically, in the illustrated example, the ground contact C5 is spaced from the supply voltage contact C1 by a maximum distance. Further, the clock contact C3, which has the highest frequency, is disposed adjacent the ground contact C5. In this manner, separating the supply voltage contact C1 and the ground contact C5 and/or positioning the clock contact C3 adjacent the ground contact C5 significantly reduces EMI.

Further, in the illustrated example, the second auxiliary contact C8 is positioned adjacent the clock contact C3, the input/output contact C7 is positioned adjacent the second auxiliary contact C8, the single wire protocol contact C6 is positioned adjacent the second auxiliary contact C8, the first auxiliary contact C4 is positioned adjacent the single-wire protocol contact C6, and the reset contact C2 is positioned adjacent the first auxiliary contact C4. Additionally or alternatively, the positions of each of the electrical contacts C1-C8 comply and/or are within the specification or standards provided by ISO/IEC 7816-2 and 7816-3 and/or the ETSI TS 102 221. For example, the following table illustrates the distance of the respective electronic contacts relative to the first edge 118a as shown in FIG. 1A.

| Electrical Contact Pin Assignment | Electrical Contact | Distance from First Edge 118a | Value (Millimeters) |
|---|---|---|---|
| C5 | Ground | D1 | 0.3 |
| C3 | Clock | D2 | 1.4 |
| C8 | Second Auxiliary | D3 | 2.5 |
| C6 | Single-Wire Protocol | D4 | 3.6 |
| C7 | Input/Output | D5 | 4.7 |
| C4 | First Auxiliary | D6 | 5.8 |
| C2 | Reset | D7 | 6.9 |
| C1 | Supply Voltage | D8 | 8.0 |

For example, the ground contact C5 is positioned at a distance D1 of approximately 0.3 millimeters from the first edge 118a, the clock contact C3 is positioned at a distance D2 of approximately 1.4 millimeters from first edge 118a, the second auxiliary contact C8 is positioned at a distance D3 of approximately 2.5 millimeters from the first edge 118a, the single-wire protocol contact C6 is positioned at a distance D4 of approximately 3.6 millimeters from the first edge 118a, the input/output contact C7 is positioned at a distance D5 of approximately 4.7 millimeters from the first edge 118a, the first auxiliary contact C4 is positioned at a distance D6 of approximately 5.8 millimeters from the first edge 118a, the reset contact C2 is positioned at a distance D7 of approximately 6.9 millimeters from the first edge 118a, and the supply voltage contact C1 is positioned at a distance D8 of approximately 8.0 millimeters from the first edge 118a.

Each of the electrical contacts 124 of the illustrated example has a rectangular shape. As shown in FIG. 1A, each of the electrical contacts 124 has a width W1 and a height H1. In this example, the width W1 is approximately 0.7 millimeters and the height H1 is approximately 3.0 millimeters. However, in other examples, each of the electrical contacts 124 may have a different sized height H1, width W1 and/or may have a square shape, rounded corners and/or any other suitable shape or configuration or any combination thereof. In addition, the electrical contacts 124 are equally spaced apart by a distance W2. In the illustrated example, the distance W2 is approximately 0.40 millimeters. Further, both the ground contact C5 and the supply voltage contact C1 are spaced from the respective first and third edges 118a and 118c by a distance of approximately 0.3 millimeters.

Although not shown, in other examples, the electrical contacts 124 illustrated in FIG. 1A can be disposed in any order. For example, the electrical contacts 124 may be disposed sequentially C1-C8 and/or in any other suitable order. In some examples, the first auxiliary input C4 may be disposed adjacent the first edge 118a of the body 102 instead of the ground contact C5 and/or the second auxiliary input C8 may be disposed adjacent the third edge 118c. In this example, the overall width 112 of the UICC 100 can be further reduced in examples in which the auxiliary contacts C4 and C8 are omitted. Additionally or alternatively, the electrical contacts 124 may include different contacts other than the electrical contacts associated with the classifications C1-C8 as described in FIG. 1A. Further, in some examples, any one of the electrical contacts C1-C8 may be omitted or replaced with another electrical contact.

To prevent a metal housing portion of an input device from electrically damaging (e.g., shorting) the electrical contacts 124 when the UICC 100 is inserted into the input device, the example UICC 100 includes a buffer area 130 between the second edge 118b and an upper edge 132 of each of the electrical contacts 124. In other words, the electrical contacts 124 are offset relative to the second edge 118b by an offset distance V1. For example, the offset distance V1 may be between approximately 0.1 millimeters and 0.50 millimeters. Further, in this example, the rounded corners of the body 102 help maintain a substantially consistent or relatively even buffer area 130 adjacent the corners of the body 102.

To facilitate handling and/or insertion/removal of the UICC 100 from an input device or card reader, the UICC 100 of the illustrated example employs a grip or pick-out feature 134. In this example, the pick-out feature 134 is disposed adjacent the fourth edge 118d between the first and third edges 118a and 118c. As shown in FIG. 1A, the pick-out feature 134 is a slot or opening. The slot shown in FIG. 1A is defined by a rectangular portion 136 disposed between first and second arcuate or circular ends 136a and 136b. A first portion of the rectangular portion is positioned at a distance V4 relative to the second edge 118b and a second portion of the rectangular portion 136 is positioned at a distance V5 from the second edge 118b. In this example, the distance V4 may be between approximately 9.69 and 9.71 millimeters and the distance V5 may be between approximately 10.39 and 10.41 millimeters such that the slot defines an opening sized between approximately 0.68 and 0.72 millimeters. In other examples, the pick-out feature 134 may be omitted.

Additionally, a first center 138a of the first arcuate end 136a is positioned at a distance P1 from the first edge 118a and a second center 138b of the second arcuate end 136b is positioned at a distance P2 from the first edge 118a. In the illustrated example, the first distance P1 is between approximately 1.9 and 2.1 millimeters and the second distance P2 is between approximately 6.9 and 7.1 millimeters from the first edge 118a. In other examples, the pick-out feature 134 may be a slot having an opening that is recessed in the first surface 114. In other words, a slot forms a recessed opening that does not pass through the entire thickness 108 of the body 102. In other examples, the pick-out feature 134 may be a raised lip portion, an aperture and/or any other surface or feature to enable or facilitate handling the UICC 100.

To secure the UICC 100 in a cavity of an input device, the example UICC 100 includes a notch or locking feature 140. More specifically, the notch 140 retains the UICC 100 within an input device and prevents the UICC from moving (e.g., bouncing) or dislodging from the input device when, for example, the electronic device experiences a sudden shock (e.g., the device is dropped). Additionally or alternatively, the notch 140 significantly reduces or prevents misalignment and facilitates proper orientation of the UICC 100 relative to the input device when the UICC 100 is coupled to the input device as described in greater detail below in connection with FIG. 3A.

The notch 140 of the illustrated example is disposed along the third edge 118c of the body 102. In particular, the notch 140 forms a recessed edge 142 spaced away from the third edge 118c and toward the first edge 118a. As shown in the example of FIG. 1A, the recessed edge 142 is positioned at a distance of P3 relative to the first edge 118a. In this example, the distance P3 is between approximately 8.29 and 8.31 millimeters. The notch 140 of the illustrated example forms a recessed opening 144 having a shoulder or catch feature 146 between a first portion 148a of the third edge 118c and a first end 142a of the recessed edge 142 and a substantially tapered edge 150 between a second portion 148b of the third edge 118c and a second end 142b of the recessed edge 142. The shoulder 146 is substantially parallel relative to the second edge 118b and substantially perpendicular relative to the first portion 148a of the third edge 118c.

Additionally, the shoulder 146 is positioned at a distance V2 from the second edge 118b of the body 102. In this example, the distance V2 is between approximately 4.49 and 4.51 millimeters. Also, the tapered edge 150 intersects the second portion 148b of the third edge 118c at a position V3 relative to the second edge 118b of the body 102. In this example, the distance V3 is between approximately 6.68 and 6.7 millimeters. Further, the example body 102 includes a radius R2 between the shoulder 146 and the recessed edge 142 and a radius R3 between the tapered edge 150 and the recessed edge 142. In this example, the radius R2 is less than or equal to 0.3 millimeters and the radius R3 is less than or equal to 0.7 millimeters. In other examples, the notch 140 may be omitted. In other examples, the notch 140 may have any other shape or profile such as described in FIGS. 11 and 12.

The example UICC 100 of FIGS. 1A and 1B may be formed via, for example, a punch-out flat sheet manufacturing process(es). The body 102 may be composed of, for example, a plastic material and the pick-out feature 134 and/or the notch 140 are formed via, for example, a punching process(es). The electrical contacts 124 may comprise a unitary sheet composed of electrically conductive material (e.g., copper, etc.) having divided contacts C1-C8 that may be coupled to the first surface 114 of the body 102 via, for example, glue, solder, or any other suitable fastener(s). The integrated circuit 122 may be positioned or coupled to the body via, for example, a pick and place robot or other manufacturing equipment. For example, the integrated circuit may be soldered onto the first surface 114 of the body 102. The wires or traces 128 may be coupled to the body 102 via wire bonding manufacturing techniques or process(es).

Alternatively, as described in greater detail below, the body 102 of the example UICC 100 may be composed of a plastic material formed via, for example, injection molding. In this manner, the body 102 and/or the UICC 100 can be manufactured with more precise tolerances (e.g., relatively tighter tolerances) compared to the flat sheet manufacturing process as described above. For example, the UICC 100 can be manufactured such that the dimensions D1-D8, P1-P3, V1-V5, R1-R3, H1, W1, W2, the height 110 and/or the width 112 can be within a tolerance value of approximately 0.1 millimeters.

Figure 2A:
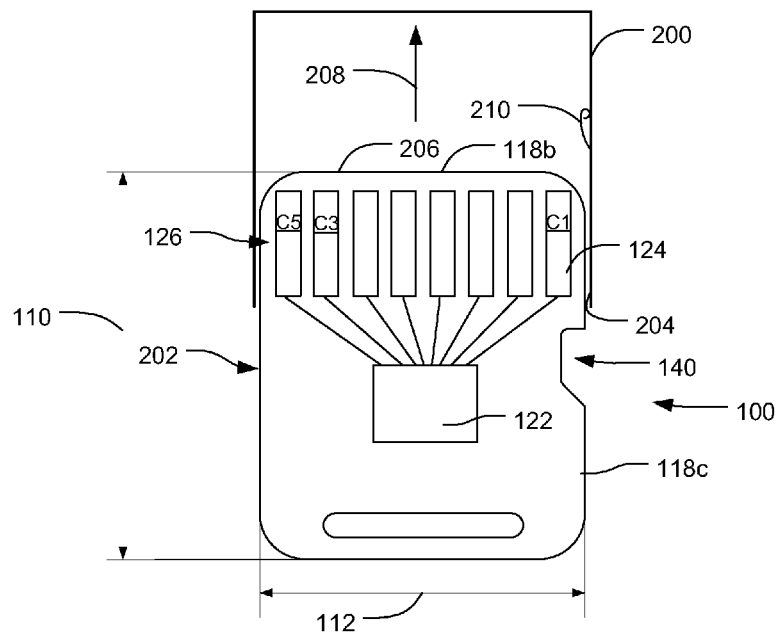
FIG. 2A illustrates the example UICC of FIG. 1A and FIG. 1B being inserted in a first example input device in a first orientation.

FIG. 2A illustrates the example UICC 100 of FIGS. 1A and 1B being inserted in an example input device or card reader 200 in a first orientation 202. Generally, the input device 200 enables communication between the UICC 100 and a host such as, for example, a computer, a point of sale terminal, a remote terminal, a mobile device, etc. In addition, the input device 200 provides power to the UICC 100 or the integrated circuit 122 and also performs protocol conversation and/or reformats data for use by the UICC 100.

In particular, the UICC 100 is inserted in an opening or cavity 204 of the input device 200 with a leading edge 206 (e.g., the second edge 118b) of the body 102 oriented in a direction represented by arrow 208. Further, due to the single row configuration 126 of the electrical contacts 124, the electrical contacts 124 do not pass over or across other electrical contacts or connectors of the input device 200 when the UICC 100 is inserted in the opening 204. Additionally or alternatively, the supply voltage contact C1 is adjacent the third edge 118c and electrically couples to the input device 200 only when the UICC 100 is fully inserted in the opening 204. In other words, the electrical contacts 124 simultaneously engage their respective electrical contacts (e.g., not shown) of the input device 200 when the UICC 100 is inserted in the input device 200. Thus, the UICC 100 receives power only after the UICC 100 is fully inserted and properly oriented relative to the opening 204 of the input device 200. Such a configuration prevents electrical damage to the electrical contacts 124, the UICC 100 and/or the input device 200. In addition, placement of the clock electrical contact C3, which has the highest frequency, adjacent the ground electrical contact C5 significantly reduces EMI.

Further, when the UICC 100 is inserted into the input device 200, the notch 140 can engage a lock or catch feature 210 of the input device 200 to secure the UICC 100 in the opening 204 of the input device 200. As a result, the UICC 100 remains secured within the input device 200. To remove the UICC 100 from the input device 100, the UICC 100 is moved in the direction of arrow 208 when the UICC 100 is in the opening 204 such that the tapered surface 150 releases the lock or catch feature 210 from the shoulder 142 of the notch 140 (e.g., the tapered surface 150 biases the catch feature 210 away from the notch 140). A spring-loaded ejection mechanism (not shown) can then eject the UICC 100 from the opening 204 and the pick-out feature 134 enables a user to firmly grasp the UICC 100 and pull it away from the opening 204 in a direction opposite of the direction indicated by the arrow 208.

Further, providing the height 110 with a dimensional value that is different than the dimensional value of the width 112 significantly prevents erroneous insertion into the opening 204 of the input device 200.

Figure 2B:
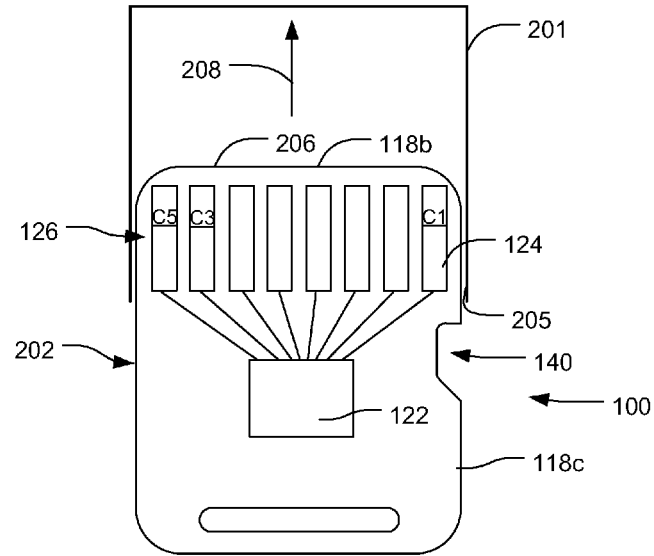
FIG. 2B illustrates the example UICC of FIG. 1A and FIG. 1B being inserted in a second example input device in the first orientation.

FIG. 2B illustrates the example UICC 100 of FIGS. 1A and 1B being inserted in another example input device or card reader 201 in the first orientation 202. In contrast with the input device 200 of FIG. 2A, the example input device 201 of FIG. 2B does not include the locking feature 210 as shown in FIG. 2A. Nonetheless, the UICC 100 properly fits within an opening 205 of the input device 201.

Figure 3A:
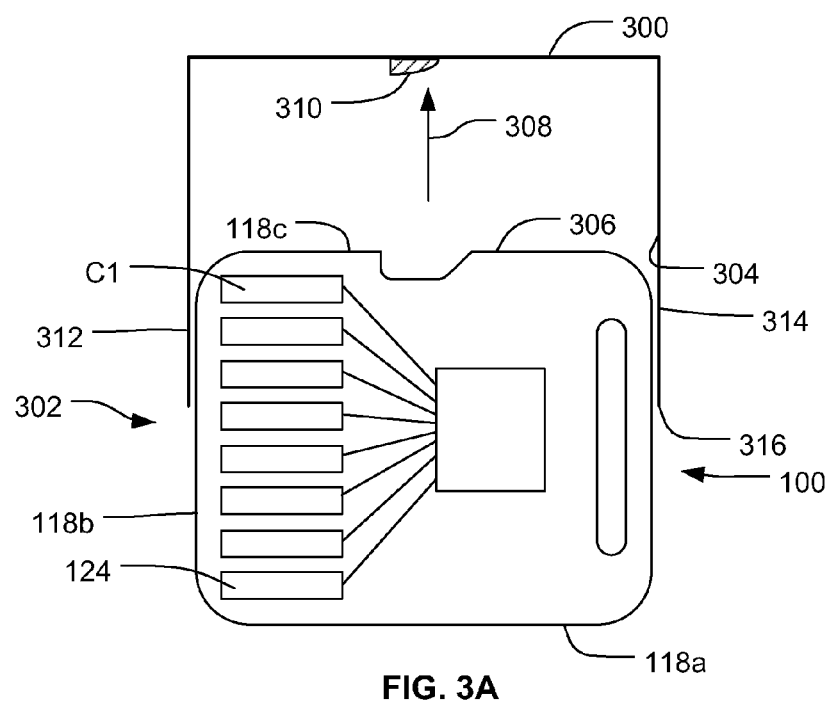
FIG. 3A illustrates the example UICC of FIG. 1A and FIG. 1B being inserted in a third example input device in a second orientation.

FIG. 3A illustrates the example UICC 100 of FIGS. 1A and 1B being inserted in another example input device or card reader 300 in a second orientation 302. Unlike the example of FIG. 2A, the UICC 100 shown in FIG. 3A is inserted in an opening 304 of the input device 300 with the third edge 118c of the body 102 as a leading edge 306 oriented in a direction represented by arrow 308. As noted above, the orientation of the electrical contacts 124 as shown in FIGS. 1A and 1B prevent electrical damage when the UICC 100 is inserted into the input device 300. Further, in this example, because the supply voltage contact C1 is adjacent the third edge 118c or the leading edge 306, the supply voltage contact C1 is the last electrical contact 124 to couple to a respective electrical contact or connector (not shown) of the input device 300 and does not drag the other electrical contacts 124 across power. As a result, the UICC 100 is not powered during insertion of the UICC 100 into the input device 300, thereby significantly reducing potential short circuits and/or electrical damage to the UICC 100. The UICC 100 receives power only after the UICC 100 is fully inserted into the opening 204 of the input device 300.

Additionally or alternatively, the notch 140 as shown in FIG. 3A facilitates or enables proper orientation of the UICC 100 relative to the opening 304 of the input device 300. More specifically, when the UICC 100 is properly oriented relative the input device 300, a guide feature 310 (e.g., a protrusion) of the input device 300 nests within the recessed opening 144 formed or defined by the notch 140. In this manner, the UICC 100 can only be properly inserted within the opening 304 of the input device 300 when the leading edge 306 of the UICC 100 is inserted within the opening 304 and the second edge 118b of the UICC 100 is adjacent a first side 312 of the input device 300. For example, the UICC 100 may not properly fit within the opening 304 if the second edge 118b is adjacent a second side 314 of the input device 300 even if the leading edge 306 is properly oriented relative to the opening 304 due to interference between the guide feature 310 and the edge 118c adjacent the notch 140. Likewise, if the UICC 300 is inserted in the input device 300 with the first edge 118a as the leading edge, the guide feature 310 interferes with the first edge 118a to prevent the UICC 300 from properly fitting within the opening 304. In some examples, the UICC 100 properly fits within the opening 304 when the first edge 118a of the UICC 100 substantially aligns with an end 316 of the opening 304 and/or the input device 300. For example, improper orientation may cause the first edge 118a of the UICC 100 to project away from the opening 304 relative to the end 316.

Figure 3B:
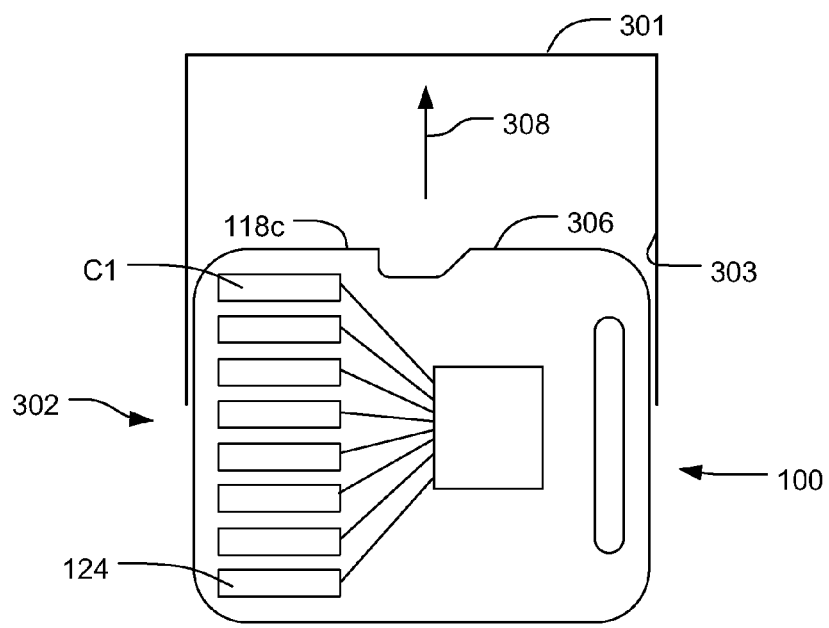
FIG. 3B illustrates the example UICC of FIG. 1A and FIG. 1B being inserted in a fourth example input device in the second orientation.

FIG. 3B illustrates the example UICC 100 of FIGS. 1A and 1B being inserted in another example input device or card reader 301 in the second orientation 302. In contrast with the input device 300 of FIG. 3A, the example input device 301 of FIG. 3B does not include the guide feature 310 shown in FIG. 3A. Nonetheless, the UICC 100 properly fits within an opening 303 of the input device 301.

Figure 4A:
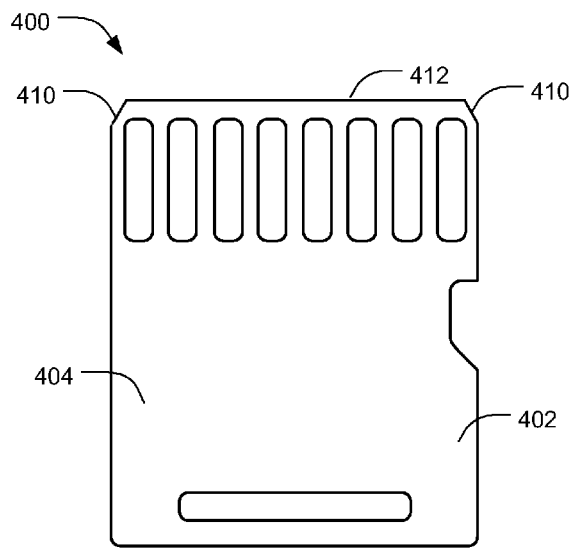
FIG. 4A is another example UICC disclosed herein.
Figure 4B:
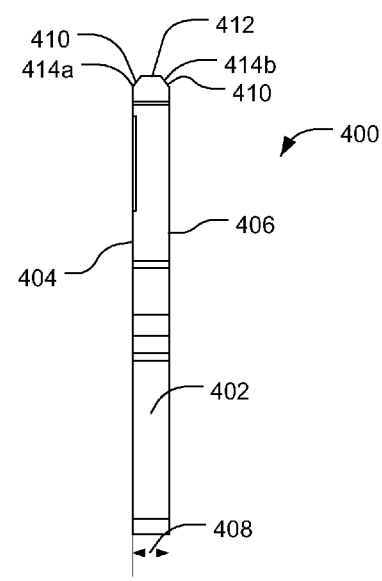
FIG. 4B is a side view of the example UICC of FIG. 4A.

FIG. 4A is a plan view of another example UICC 400 disclosed herein. The example UICC 400 of FIG. 4A includes a body 402 defining a first side or surface 404 and a second surface or surface 406 opposite the first surface 404. The first and second surfaces 404 and 406 of the illustrated example are spaced apart to define a body thickness 408. To facilitate insertion of the UICC 400 into an input device or card reader, the example UICC 400 of FIG. 4A employs a lead-in feature 410. As shown in FIG. 4A, the lead-in feature 410 is disposed on a leading end 412 of the UICC 400. Additionally, in the illustrated example, each of the first and second surfaces 404 and 406 includes the lead-in feature 410. However, in other examples, only the first surface 404 or the second surface 406 includes the lead-in feature 410. As most clearly shown in FIG. 4B, the lead-in feature 410 of the illustrated example includes tapered edges 414a and 414b adjacent the leading edge 412. In other examples the lead-in feature 410 may be chamfered edges, angled edges, rounded edges, or any other shaped-edge to facilitate insertion of the UICC 400 in an input device such as the input device 200 of FIG. 2. The lead-in feature 410 may be formed via secondary manufacturing process(es) such as, for example, machining (e.g., chamfer milling) and/or other suitable manufacturing process(es). In some examples, the lead-in feature 410 may be formed via injection molding to eliminate a secondary manufacturing process as described in greater detail below in connection with FIG. 9A, FIG. 9B and FIG. 9C.

Figure 5:
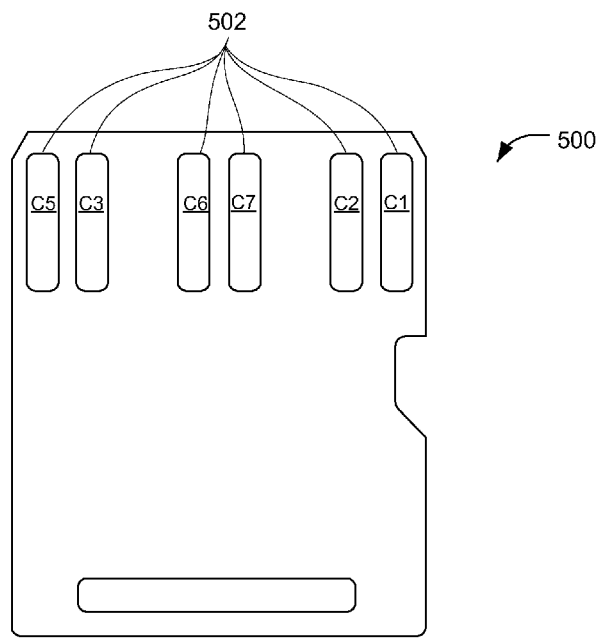
FIG. 5 is another example UICC disclosed herein.

FIG. 5 illustrates another example UICC 500 disclosed herein. The UICC 500 of FIG. 5 is implemented with a plurality of electrical contacts 502 (e.g., six electrical contacts). In the illustrated example, the electrical contacts 502 may include, for example, the ground contact C5, the clock contact C3, the single-wire protocol contact C6, the input/output contact C7, the reset contact C2 and the supply voltage contact C1. For example, the first and second auxiliary electrical contacts C4 and C8 of FIGS. 1A and 1B may be omitted. In other examples, the UICC 500 may include only one of the auxiliary electrical contacts C4 or C8 of FIG. 1A.

Figure 6A:
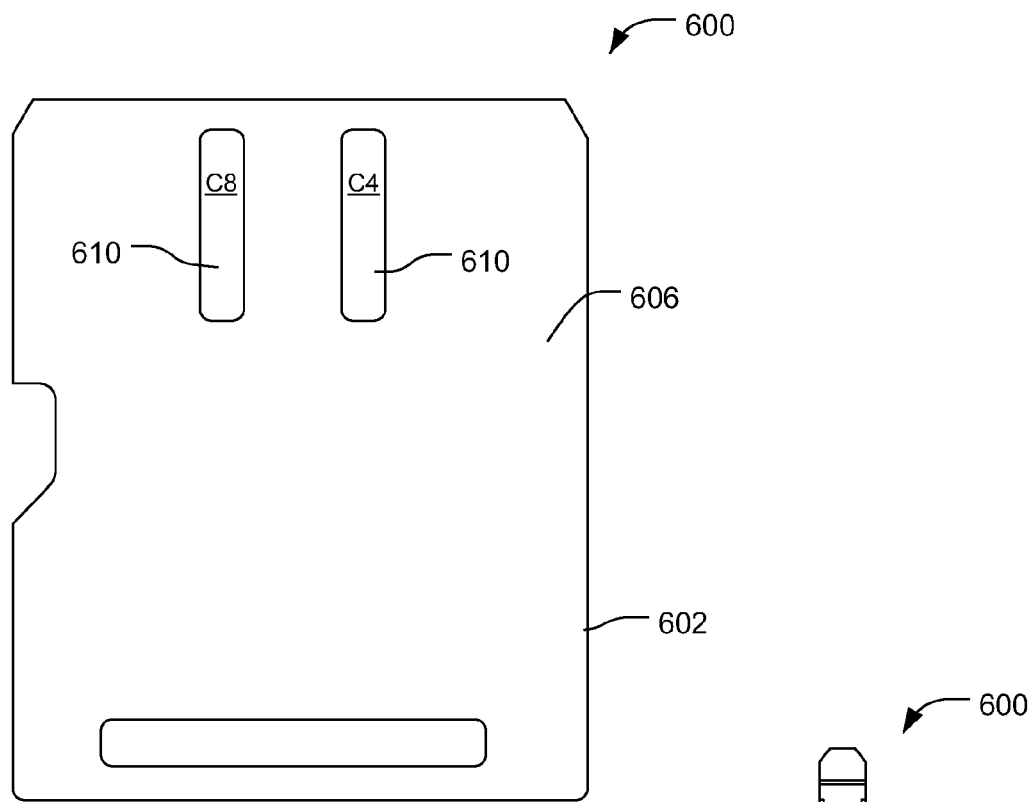
FIG. 6A illustrates another example UICC disclosed herein.
Figure 6B:
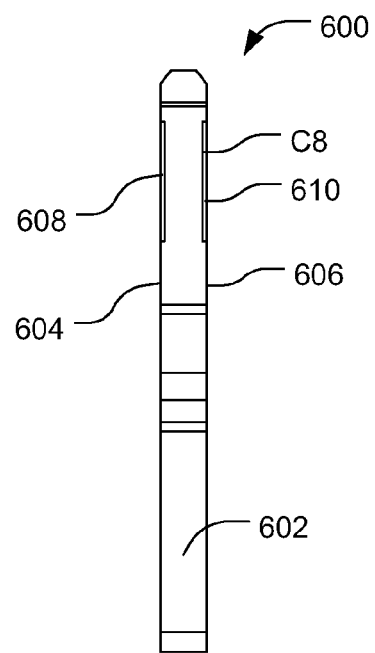
FIG. 6B is a side view of the example UICC of FIG. 6A.

FIG. 6A illustrates another example UICC 600 disclosed herein. FIG. 6B is a side view of another example UICC 600 disclosed herein. Referring to FIGS. 6A and 6B, the UICC 600 of FIG. 6A and FIG. 6B is a dual-sided UICC. The UICC 600 of FIG. 6A includes a body 602 defining a first side or surface 604 (FIG. 6B) and a second side or surface 606 opposite the first surface 604. In particular, the first surface 604 of the UICC 600 includes one or more electrical contacts 608 and the second surface 606 of the UICC 600 includes one or more electrical contacts 610. For example, the electrical contacts 608 disposed on the first surface 604 of the UICC 600 may include the electrical contacts C1-C3, C5-C7 as shown, for example, in FIG. 5, and the electrical contacts 610 disposed on the second surface 606 may include, for example, the first and second auxiliary contacts C4 and C8 of FIG. 1A. A dual-sided header-style input device or card reader may be employed to communicatively couple the electrical contacts on both surfaces 604 and 606 of the UICC 600 to a host (e.g., an electrical device).

Figure 7:
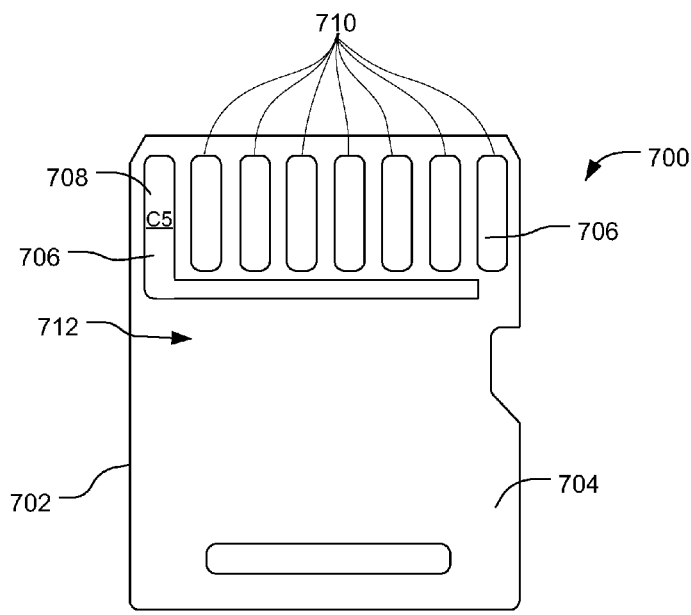
FIG. 7 illustrates another example UICC disclosed herein.

FIG. 7 illustrates another example UICC 700 disclosed herein. As shown in FIG. 7, the UICC 700 includes a body 702 defining a first side or surface 704 that includes a plurality of electrical contacts 706. In particular, as shown in FIG. 7, an electrical contact 708 of the plurality of electrical contacts 706 has a different size and/or shape than the other ones of the electrical contacts 710. More specifically, the electrical contact 708 expands or covers a greater surface area 712 of the first surface 704 relative to the other electrical contacts 710. For example, as shown, the electrical contact 708 may be a ground electrical contact C5. Increasing a surface area of the ground electrical contact C5 may significantly reduce EMI.

Figure 8:
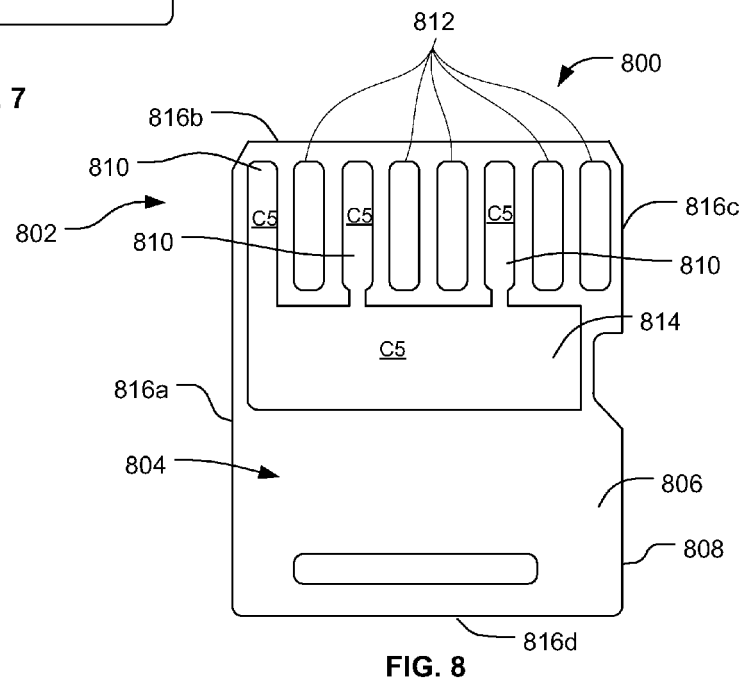
FIG. 8 illustrates another example UICC disclosed herein.

FIG. 8 illustrates another example UICC 800 disclosed herein. More specifically, the UICC 800 of FIG. 8 illustrates another example electrical contact configuration 802 expanding across a surface area 804 of a first side or surface 806 of a body 808 of the UICC 800. As shown, the UICC 800 includes a first plurality of electrical contacts 810 and a second plurality of electrical contacts 812. In particular, the first plurality of electrical contacts 810 are interconnected or electrically coupled via a coupling portion 814 to cover a greater amount of the surface area 804 of the first surface 806 than for example the electrical contacts 810 or the electrical contacts 124 of FIG. 1A. For example, the first plurality of electrical contacts 810 and the coupling portion 814 may be the ground electrical contact C5. As noted above, configuring the ground contact C5 to cover or expand across a greater amount of surface area on the first surface 806 may significantly reduce EMI. In other examples, an electrical contact and/or the coupling portion 814 may span across substantially the entire surface area 804 of the first surface 806 between peripheral edges 816a-d of the UICC 800.

FIG. 9A illustrates a perspective view of another example UICC 900 disclosed herein. FIG. 9B is a plan view of the example UICC 900 of FIG. 9B. FIG. 9C is an exploded view of the example UICC 900 of FIGS. 9B and 9C.

The UICC 900 of FIGS. 9A-9C includes a body 902 defining a first side or surface 904 and a second side or surface 906 opposite the first surface 904. In the illustrated example, the body 902 or the first surface 904 is approximately 9 millimeters by 11 millimeters and defines a surface area 904a of approximately 99 millimeters squared. The body 902 of the illustrated example is composed of a plastic material (e.g., a Laser Direct Structuring (LDS) resin) and is formed via, for example, injection molding. As shown, because the body 902 may be formed via injection molding, the example body 902 may include a recessed cavity 912 to receive an integrated circuit or microprocessor 914. Also, forming the body 902 via, for example, injection molding enables the body 902 to be formed with relatively more precise and/or tighter tolerances compared to other manufacturing process(es) such as, the flat sheet manufacturing process(es) described above. In addition, forming the body 902 via injection molding provides a relatively smoother surface finish to the first surface 904 and/or the second surface 906 and provides relatively smoother corners 908a-d or edges 910a-d compared to other manufacturing process(es) such as the flat-sheet manufacturing process. Providing relatively smoother surface finishes, corners and/or edges facilitates insertion and/or an interaction between the UICC 900 and an input device or card reader.

In the illustrated example, after the body 902 is formed via an injection molding process, one or more electrical contacts 916 and/or one or more electrical traces or connectors 918 electrically coupling the electrical contacts 916 to the integrated circuit 914 may be formed or etched in the body 902 via, for example, LDS manufacturing process. Such a process enables injection molded plastic parts to be selectively plated with discrete circuit pathways (i.e., the traces 918). To this end, a laser basically etches, writes or prints a conductive pattern corresponding to the position of the electrical contacts 916 and/or the electrical connectors 918 onto the first surface 904 of the body 902 after the body 902 is formed via injection molding. The body 902 is then immersed within a copper bath to provide the conductive electrical contacts 916 and/or traces 918. For example, the electrical contacts 916 may include the electrical contacts C1-C8 described in FIG. 1A and may include the electrical contact orientation or layout provided by the example UICC 100 of FIG. 1A.

The integrated circuit or microprocessor 914 may then be disposed in the cavity 912 of the body 902 via, for example, a pick and place robot and the integrated circuit or microprocessor 914 may be coupled to the body 902 via, for example, soldering. A cover or screen 920 such as a laminate cover may be coupled to the body 902 and disposed over the integrated circuit 914 to protect the integrated circuit from debris and/or other contaminates.

To facilitate insertion in an input device, the example UICC 900 of the illustrated example includes a lead-in feature 922 adjacent a leading edge 924. In this example, the lead-in feature 922 may be the rounded corners 908b and 908c and/or may include an arcuate or curved shaped profile. In other examples, the lead-in feature 922 may be a tapered or chamfered edge adjacent the leading edge 924 such as, for example, the tapered or chamfered edge 410 illustrated in FIG. 4A. The lead-in feature 922 may be formed during the injection molding process. Thus, unlike the flat-sheet punch out manufacturing process, the example lead-in feature 922 may be formed with the body 902, thereby eliminating secondary manufacturing process(es) and/or significantly reducing costs.

The example UICC of FIGS. 9A-9C also includes a pick-out feature 926 to facilitate removal of the UICC 900 from an input device. In the illustrated example, the pick-out feature 926 comprises a raised lip or molded ridge 928 protruding away from the first surface 904 adjacent the edge 910d of the first surface 904. As shown in FIGS. 9A-9C, the raised lip 928 has an arcuate profile, edge or shape. In other examples, the second surface 906 opposite the first surface 904 may also include a raised lip or molded ridge (e.g., similar to the raised lip 928) protruding away from the second surface 906. In some examples, the raised lip or molded ridge 928 may be disposed on the second surface 906 instead of the first surface 904.

The body 902 of the illustrated example also includes a notch 930. The notch 930 is formed on the edge 910c of the body 902 between the electrical contacts 916 and the raised lip 928 and provides a catch or locking feature similar to the locking feature described in connection with FIGS. 1A and 1B.

Figure 10A:
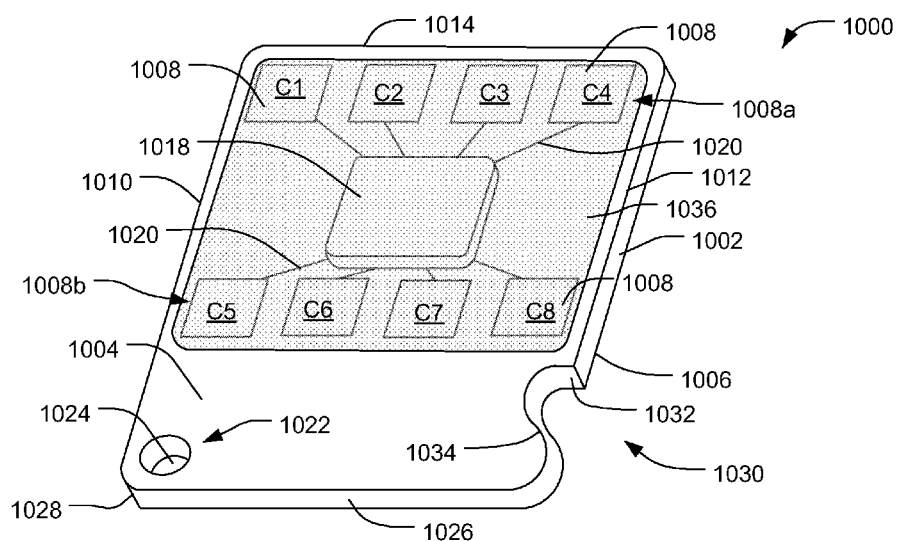
FIG. 10A is a perspective view of another example UICC disclosed herein.
Figure 10B:
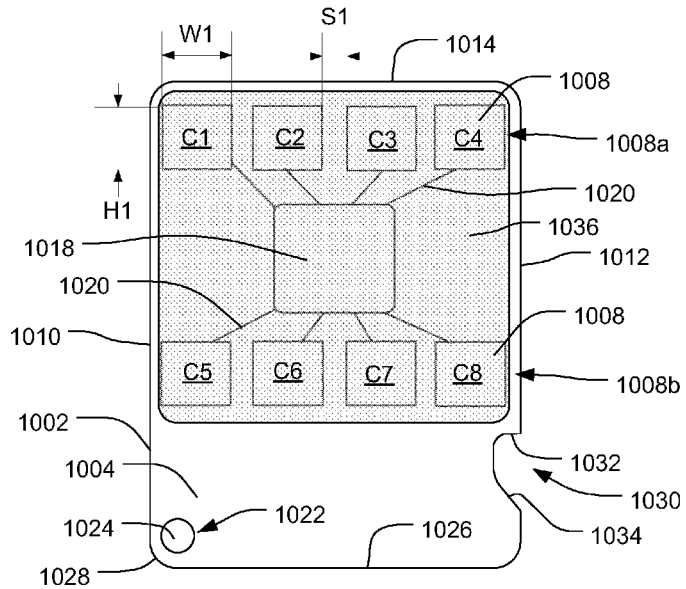
FIG. 10B is a plan view of the example UICC of FIG. 10A.

FIG. 10A is a perspective view of another example UICC 1000 disclosed herein. FIG. 10B is a plan view of the example UICC 1000 of FIG. 10A. Referring to FIGS. 10A and 10B, the UICC 1000 comprises a body 1002 defining a first or front surface or side 1004 and a second or rear surface or side 1006 opposite the first surface 1004. The body 1002 of the illustrated example includes a plurality of electrical contacts 1008 positioned or arranged in a plurality of rows 1008a and 1008b. For example, a first row 1008a of electrical contacts 1008 may include the supply voltage contact C1 adjacent a first edge 1010, the reset contact C2 adjacent the supply voltage contact C1, the clock contact C3 adjacent the reset contact C2, and the first auxiliary contact C4 adjacent the clock contact C3 and/or a second edge 1012. Additionally, a second row 1008b of electrical contacts 1008 may include the ground contact C5 adjacent the first edge 1010 and below the supply voltage contact C1, the single-wire protocol contact C6 adjacent the ground contact C5, the input/output contact C7 adjacent the single-wire protocol contact C6, and the second auxiliary contact C8 adjacent the input/output contact C7.

In the illustrated example, the supply voltage contact C1 and the ground contact C5 may be disposed a distance of approximately 0.45 millimeters from the first edge 1010, the reset contact C2 and the single-wire protocol electrical contact C6 may be disposed a distance of approximately 2.65 millimeters from the first edge 1010, the clock contact C3 and the input/output contact C7 may be disposed a distance of approximately 4.85 millimeters from the first edge 1010, and the first and second auxiliary contacts C4 and C8 may be positioned at a distance of approximately 7.05 millimeters from the first edge 1010.

In addition, the first row 1008a of electrical contacts 1008 may be positioned at a distance of approximately 0.5 millimeters from a third edge 1014 and the second row 1008b of electrical contacts 1008 may be positioned at a distance of approximately 5.80 millimeters from the third edge 1014. A spacing or area S1 between each of the electrical contacts 1008 may be, for example, 0.75 millimeters. The supply voltage contact C1 and the ground contact C5 may be positioned from the first edge 1010 at a distance of approximately 0.45 millimeters and the each of the first and second auxiliary contacts C4 and C8 may be positioned from the second edge 1012 at a distance of approximately 0.45 millimeters.

Each of the electrical contacts 1008 of the illustrated example has a substantially square shape or profile. As shown in FIG. 10B, a width W1 of each of the electrical contacts 1008 is approximately 1.5 millimeters and a height H1 of each of the electrical contacts 1008 is approximately 1.5 millimeters. However, in other examples, each of the electrical contacts 1008 may have a rectangular shape and/or any other suitable shape or configuration and/or a combination thereof.

Each of the electrical contacts 1008 is electrically coupled to an integrated circuit or microprocessor 1018 via respective traces or wires 1020. The electrical contacts 1008 may be coupled to the body 1002 (e.g., via a glue, solder, etc.) and the traces or wires 1020 may be coupled to the body 1002 via, for example, wire bonding manufacturing process. In other examples, the body 1002 may be formed via injection molding and the electrical contacts 1008 and/or the traces or wires 1020 may be formed on the body 1002 via, for example, LDS manufacturing process.

The example UICC 1000 of the illustrated example also includes a pick-out feature 1022. In the illustrated example, the pick-out feature 1022 is an aperture or hole 1024 disposed adjacent a fourth edge 1026. In particular, the aperture 1024 is formed adjacent a corner 1028 defined by the first edge 1010 and the fourth edge 1026. However, in other examples, the pick-out feature 1022 may be disposed between the first and third edges 1010 and 1014 or adjacent a corner formed by the third 1014 and a fourth edge 1026.

The example UICC 1000 of the illustrated example also employs a notch 1030 to secure the UICC 100 in a card reader. As shown, the notch 1030 is formed along the third edge 1014 between the second row of electrical contacts 1008b and the fourth edge 1026. Because the UICC 1000 includes the first and second rows 1008a and 1008b of electrical contacts 1008 disposed over a greater amount of surface area of the first surface 1004 of the body 1002, the notch 1030 is formed adjacent the fourth edge 1026. The notch 1030 includes a shoulder 1032 to provide a stop or engage a catch feature of an input device and a tapered surface 1034 to release the catch feature when the UICC 1000 is removed from the input device. The input device may be a card reader such as a two-row, header-style card reader. Additionally, to protect the electrical contacts 1008 and/or the integrated circuit 1018 from contaminates and/or to provide electrical insulation, the UICC 100 may include a cover or laminate 1036. The cover 1036 of the illustrated example is coupled to the first surface 1004 and disposed over the electrical contacts 1024 and the integrated circuit 1018.

Figure 11:
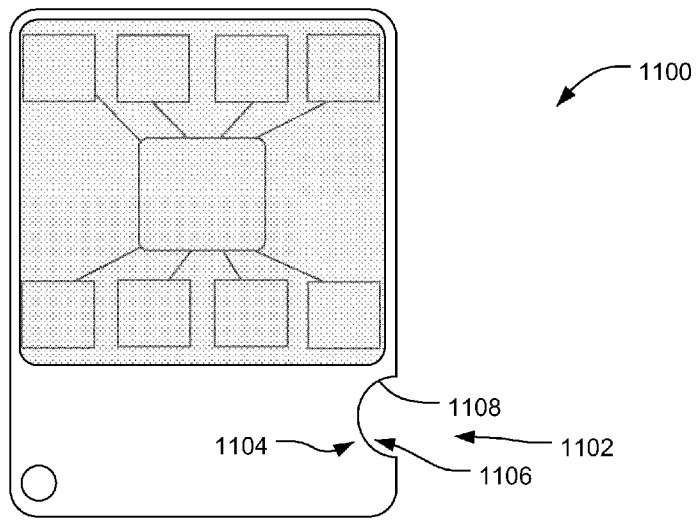
FIG. 11 illustrates another example UICC disclosed herein.

FIG. 11 illustrates another example UICC 1100 having another example locking feature or notch 1102 described herein. In this example, the notch 1102 has a substantially arcuate profile or shape 1104 forming a cavity 1106 to engage, accept, release and/or interact with a locking mechanism (e.g. a biasing element or spring) of an input device. In particular, the arcuate profile 1104 of the illustrated example has a semi-circular or circular shape or profile 1108. In another example, the arcuate shape 1104 may have an oval shape, an elliptical shape, and/or may employ any other suitable shape or profile to engage a locking mechanism of, for example, an input device.

Figure 12:
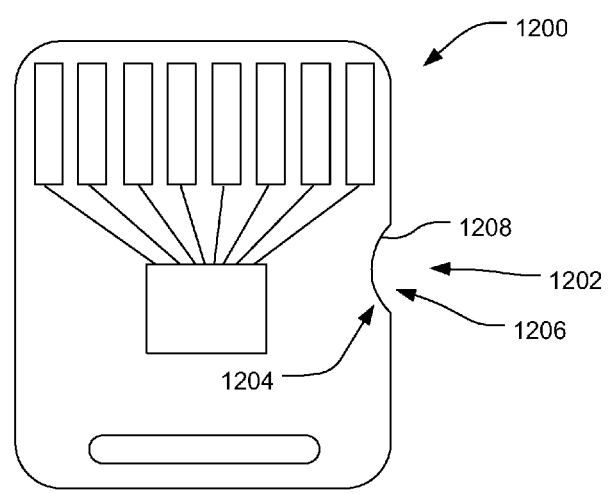
FIG. 12 illustrates another example UICC disclosed herein.

FIG. 12 illustrates another example UICC 1200 having another example locking feature or notch 1202 described herein. In this example, the notch 1202 has a substantially arcuate profile or shape 1204 forming a cavity 1206 to engage, accept, release and/or interact with a locking mechanism (e.g. a biasing element or spring) of an input device. In particular, the arcuate profile 1204 of the illustrated example has an oval or elliptical profile 1208. In another example, the arcuate shape 1204 may have a circular shape or profile and/or may employ any other suitable shape or profile to engage a locking mechanism of, for example, an input device.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A UICC comprising:
    a body having a height between approximately 10.9 millimeters and 11.1 millimeters and a width between approximately 8.9 millimeters and 9.1 millimeters, the body having a first side defined by a plurality of peripheral edges, the plurality of peripheral edges having a first peripheral edge, a second peripheral edge, a third peripheral edge and a fourth peripheral edge, wherein the first peripheral edge is opposite the third peripheral edge and the second peripheral edge is opposite the fourth peripheral edge; and
    a plurality of electrical contacts disposed on the first side of the body adjacent the second peripheral edge and between the first peripheral edge and the third peripheral edge, the plurality of electronic contacts comprise a supply voltage contact, a reset contact, a clock contact, a ground contact, a input/output contact, a single protocol contact, a first auxiliary contact, and a second auxiliary contact, wherein the ground contact is adjacent the first peripheral edge, the clock contact is adjacent the ground contact, the second auxiliary contact is adjacent the clock contact, the input/output contact is adjacent the second auxiliary contact, the single protocol contact is adjacent the second auxiliary contact, the first auxiliary contact is adjacent the single protocol contact, the reset contact is adjacent the first auxiliary contact, and the supply voltage contact is adjacent the reset contact and the third peripheral edge.

2. The UICC of claim 1, wherein the height is approximately 11 millimeters and the width is approximately 9 millimeters.

3. The UICC of claim 1, wherein the body comprises a substantially rectangular shape having rounded corners, wherein each of the rounded corners comprises a first radius that is less than or equal to 0.8 millimeters.

4. The UICC of claim 1, wherein the plurality of electrical contacts are substantially aligned along the second peripheral edge between the first peripheral edge and the third peripheral edge.

5. The UICC of claim 1, wherein the plurality of electrical contacts are offset relative to the second peripheral edge by an offset distance of between approximately 0.1 millimeters and 0.50 millimeters.

6. The UICC of claim 1, wherein the ground contact is positioned at a distance of approximately 0.3 millimeters from the first peripheral edge, the clock contact is positioned at a distance of approximately 1.4 millimeters from first peripheral edge, the second auxiliary contact is positioned at a distance of approximately 2.5 millimeters from the first peripheral edge, the input/output contact is positioned at a distance of approximately 3.6 millimeters from the first peripheral edge, the single protocol contact is positioned at a distance of approximately 4.7 millimeters from the first peripheral edge, the first auxiliary contact is positioned at a distance of approximately 5.8 millimeters from the first peripheral edge, the reset contact is positioned at a distance of approximately 6.9 millimeters from the first peripheral edge, and the supply voltage contact is positioned at a distance of approximately 8.0 millimeters from the first peripheral edge.

7. The UICC of claim 1, wherein each of the electrical contacts has a size of approximately 3.0 millimeters by 0.7 millimeters.

8. The UICC of claim 1, further comprising a pick-out feature disposed adjacent the fourth peripheral edge of the body.

9. The UICC of claim 8, wherein the pick-out feature comprises a slot.

10. The UICC of claim 9, wherein the slot comprises a rectangular portion disposed between a first arcuate end and a second arcuate end.

11. The UICC of claim 10, wherein a first center of the first arcuate end is between approximately 1.9 and 2.1 millimeters from the first peripheral edge and a second center of the second arcuate end is between approximately 6.9 and 7.1 millimeters from the first peripheral edge.

12. The UICC of claim 1, further comprising a notch formed in the third peripheral edge.

13. The UICC of claim 12, wherein the notch forms a recessed edge spaced away from the third peripheral edge and toward the first peripheral edge.

14. The UICC of claim 13, wherein the recessed edge is between approximately 8.29 and 8.31 millimeters from the first peripheral edge.

15. The UICC of claim 14, wherein the notch forms a first recessed opening having a shoulder between a first portion of the third peripheral edge and a first end of the recessed edge and a substantially tapered edge between a second portion of the third peripheral edge and a second end of the recessed edge.

16. The UICC of claim 15, wherein the shoulder is positioned between approximately 4.49 and 4.51 millimeters from the second peripheral edge.

17. The UICC of claim 16, further comprising a second radius between the shoulder and the recessed edge, the second radius is less than or equal to 0.3 millimeters.

18. The UICC of claim 15, wherein the tapered edge intersects the second portion of the third peripheral edge at a position between approximately 6.68 and 6.7 millimeters from the second peripheral edge.

19. The UICC of claim 18, further comprising a third radius between the tapered edge and the recessed edge, wherein the third radius is less than or equal to 0.7 millimeters.

20. A UICC comprising;
    a body defining a first surface and a second surface opposite the first surface; and
    a first plurality of electrical contacts disposed on the first surface, the plurality of electrical contacts including a ground electrical contact, a voltage supply electrical contact and a clock electrical contact, the ground electrical contact positioned adjacent a first edge of the body, the voltage supply electrical contact positioned adjacent a second edge of the body opposite the first edge, and the clock electrical contact positioned adjacent the ground electrical contact, wherein the positioning of the voltage supply electrical contact or the clock electrical contact relative to the ground electrical contact significantly reduces electromagnetic interference.

21. The UICC of claim 20, wherein the first plurality of electrical contacts is substantially aligned relative to a third edge of the body, the third edge being disposed between the first and second edges and is substantially perpendicular to the first and second edges.

22. The UICC of claim 21, wherein the clock electrical contact is positioned between the ground electrical contact and an input/output electrical contact.

23. The UICC of claim 21, further comprising a second plurality of contacts disposed on the second surface of the body adjacent the third edge.

24. The UICC of claim 23, wherein the second plurality of contacts comprises a first auxiliary electrical contact and a second auxiliary electrical contact.

25. The UICC of claim 21, further comprising a pick-out feature adjacent a fourth edge of the body opposite the third edge, the fourth edge being positioned between the first and second edges.

26. The UICC of claim 25, wherein the pick-out feature comprises a slot disposed adjacent the fourth edge and between the first and second edges.

27. The UICC of claim 25, wherein the pick-out feature comprises an opening adjacent a corner formed by the first edge and the fourth edge.

28. The UICC of claim 25, wherein the pick-out feature comprises a raised lip extending away from the first surface and disposed adjacent the fourth edge.

29. The UICC of claim 20, further comprising a notch formed in the second edge.

30. The UICC of claim 29, wherein the notch includes a shoulder to engage a lock mechanism of a card reader to maintain a position of the UICC relative the card reader.

31. The UICC of claim 30, wherein the notch includes a tapered surface to release the lock mechanism of the card reader when the UICC is to be removed from the card reader.

32. The UICC of claim 20, wherein the first surface has a surface area of approximately 99 millimeters squared.

33. The UICC of claim 20, wherein the first surface comprises a cavity to receive an integrated circuit.

34. A UICC comprising:
a body defining a first surface and a second surface opposite the first surface; and
a plurality of electrical contacts disposed on the first surface, a ground electrical contact of the electrical contacts being disposed adjacent a first edge of the body and a voltage supply electrical contact of the electrical contacts being disposed adjacent a second edge of the body opposite the first edge, the electrical contacts being substantially aligned relative to a third edge of the body, the third edge being disposed between the first and second edges and substantially perpendicular to the first and second edges, a clock electrical contact of the electrical contacts being disposed between the ground electrical contact and an input/output electrical contact, and a reset electrical contact of the electrical contacts being disposed adjacent the voltage supply electrical contact and a single wire protocol electrical contact of the electrical contacts being disposed between the input/output electrical contact and the reset electrical contact.

35. The UICC of claim 34, wherein the plurality of electrical contacts further comprises a first auxiliary electrical contact disposed between the single wire protocol electrical contact and the reset electrical contact, and a second auxiliary input disposed between the clock electrical contact and the input/output electrical contact.

* * * * *

UNITED STATES PATENT AND TRADEMARK OFFICE
CERTIFICATE OF CORRECTION

PATENT NO. : 8,649,820 B2  
APPLICATION NO. : 13/290874  
DATED : February 11, 2014  
INVENTOR(S) : Schwandt et al.

It is certified that error appears in the above-identified patent and that said Letters Patent is hereby corrected as shown below:

In the Claims

Column 15, line 30 (claim 1), replace --a-- between "contact," and "input/output" with --an--.
Column 15, line 60 (claim 6), insert --the-- between "from" and "first".

Signed and Sealed this
Twenty-ninth Day of April, 2014

Michelle K. Lee
*Deputy Director of the United States Patent and Trademark Office*